US010477552B2

(12) United States Patent
Chen et al.

(10) Patent No.: US 10,477,552 B2
(45) Date of Patent: Nov. 12, 2019

(54) TECHNIQUES FOR HANDLING WIDE BANDWIDTH COMMUNICATIONS

(71) Applicant: QUALCOMM Incorporated, San Diego, CA (US)

(72) Inventors: Wanshi Chen, San Diego, CA (US); Peter Gaal, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 15/879,276

(22) Filed: Jan. 24, 2018

(65) Prior Publication Data
US 2018/0235025 A1 Aug. 16, 2018

Related U.S. Application Data

(60) Provisional application No. 62/458,524, filed on Feb. 13, 2017.

(51) Int. Cl.
H04W 72/04 (2009.01)
H04L 5/00 (2006.01)

(52) U.S. Cl.
CPC ......... *H04W 72/0453* (2013.01); *H04L 5/001* (2013.01); *H04L 5/0064* (2013.01);
(Continued)

(58) Field of Classification Search
CPC ..... H04W 24/02; H04W 28/08; H04W 36/22; H04W 24/08; H04W 24/00; H04W 72/00; H04W 36/14; H04W 28/02; H04W 88/02; H04W 36/26; H04W 48/18; H04W 4/50; H04W 72/1289; H04W 84/18; H04W 88/08; H04W 36/04; H04W 48/12; H04W 48/20
(Continued)

(56) References Cited

U.S. PATENT DOCUMENTS

2016/0338107 A1* 11/2016 Zeng .................. H04W 16/14
2017/0374686 A1* 12/2017 Agarwal ............ H04W 72/085

OTHER PUBLICATIONS

International Search Report and Written Opinion—PCT/US2018/015212—ISA/EPO—Apr. 23, 2018 (172782WO).
(Continued)

*Primary Examiner* — Ajibola A Akinyemi
(74) *Attorney, Agent, or Firm* — Holland & Hart, LLP

(57) ABSTRACT

Techniques are described for wireless communication. A method for wireless communication at a user equipment (UE) includes transmitting, to a network access device, a first indication of a supported radio frequency (RF) bandwidth capability of the UE and a second indication of an RF component configuration of the UE associated with the supported RF bandwidth capability of the UE; and communicating with the network access device based at least in part on the supported RF bandwidth capability of the UE and the RF component configuration of the UE. A method for wireless communication at a network access device includes receiving the first indication and the second indication from the UE, and communicating with the UE based at least in part on the supported RF bandwidth capability of the UE and the RF component configuration of the UE.

85 Claims, 13 Drawing Sheets

(52) U.S. Cl.
CPC ......... *H04L 5/0092* (2013.01); *H04W 72/048* (2013.01); *H04L 5/0023* (2013.01)

(58) Field of Classification Search
USPC .......................................................... 455/75
See application file for complete search history.

(56) References Cited

OTHER PUBLICATIONS

NTT Docomo et al., "Framework for Leveraging an Ultra-Wideband Spectrum", 3GPP Draft; R4-168455_NR-CBW_V4, 3rd Generation Partnership Project (3GPP), Mobile Competence Centre; 650, Route Des Lucioles; F-06921 Sophia-Antipolis Cedex; France, vol. RAN WG4, No. Ljubljana, Slovenia; Oct. 10, 2016-Oct. 14, 2016 Sep. 30, 2016, XP051165830, Retrieved from the Internet: URL:http://www.3gpp.org/ftp/tsg_ran/WG4_Radio/TSGR4_80Bis/Docs/ [retrieved on Sep. 30, 2016], 5 pages.

Qualcomm Incorporated: "Views on Wideband NR Operation", 3GPP Draft; R1-1702650 Views on Wideband NR Operation, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 12, 2017, XP051209799, Retrieved from the Internet: URL:http://www.3gpp.org/ftp/Meetings_3GPP_SYNC/RAN1/Docs/ [retrieved on Feb. 12, 2017], 5 pages.

Qualcomm Incorporated: "Wider Single Carrier Channel for NR", 3GPP Draft; R4-1609819, 3rd Generation Partnership Project (3GPP), Mobile Competence Centre; 650, Route Des Lucioles; F-06921 Sophia-Antipolis Cedex; France, vol. RAN WG4, No. Reno, U.S.A; Nov. 14, 2016-Nov. 18, 2016 Nov. 4, 2016, XP051195090, Retrieved from the Internet: URL:http://www.3gpp.org/ftp/tsg_ran/WG4_Radio/TSGR4_81/Docs/ [retrieved on Nov. 4, 2016], 2 pages.

Samsung: "Wide Bandwidth Operational Aspects", 3GPP Draft; R1-1612436 Wide Bandwidth Operational Aspects, 3rd Generation Partnership Project (3GPP), Mobile Competence Centre; 650, Route Des Lucioles; F-06921 Sophia-Antipolis Cedex; France, vol. RAN WG1, No. Reno, US; Nov. 14, 2016-Nov. 18, 2016 Nov. 13, 2016, XP051176384, Retrieved from the Internet: URL:http://www.3gpp.org/ftp/Meetings_3GPP_SYNC/RAN1/Docs/ [retrieved on Nov. 13, 2016], 4 pages.

* cited by examiner

TECHNIQUES FOR HANDLING WIDE BANDWIDTH COMMUNICATIONS

CROSS REFERENCES

The present Application for Patent claims priority to U.S. Provisional Patent Application No. 62/458,524 by Chen, et al., entitled "TECHNIQUES FOR HANDLING WIDE BANDWIDTH COMMUNICATIONS," filed Feb. 13, 2017, assigned to the assignee hereof.

BACKGROUND

Field of the Disclosure

The present disclosure, for example, relates to wireless communication systems, and more particularly to techniques for handling wide bandwidth communications.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In a next generation, new radio (NR), 3GPP 5G, or millimeter wave (mmWave) network, a network access device may take the form of a smart radio head (RH) or access node controller (ANC), with a set of smart radio heads in communication with an ANC defining a gNodeB (gNB). In a wireless local area network (WLAN), a network access device may take the form of a WLAN access point. A network access device may communicate with a UE on downlink channels (e.g., for transmissions from the network access device to the UE) and uplink channels (e.g., for transmissions from the UE to the network access device).

In some wireless communications systems, some wireless devices may support operation over the maximum bandwidth supported by the wireless communication system, and other wireless devices (e.g., UEs, lower cost UEs, or lower cost or shorter range network access devices) may support operation over a smaller bandwidth.

SUMMARY

Techniques for handling wide bandwidth communications are described. In a wireless communication system that supports wide bandwidth communications, some wireless devices in the wireless communication system may not include a radio frequency (RF) chain that supports the wide bandwidth. For example, some wireless devices may not support a maximum carrier (or component carrier (CC)) bandwidth. In such wireless devices, it may be useful for wireless devices with which the wireless device communicates to receive an indication of the supported RF bandwidth capability of the wireless device and/or an RF component configuration of the wireless device. This information may be used to receive a transmission from the wireless device (e.g., to account for amplitude and phase discontinuities between different RF chains of the wireless device). The information may also be used to transmit to the wireless device, or to schedule transmissions of the wireless device, such that RF boundaries between different RF chains of the wireless device are not crossed or are accounted for).

In one example, a method for wireless communication at a UE is described. The method may include transmitting, to a network access device, a first indication of a supported bandwidth capability of the UE, the supported bandwidth capability of the UE being less than a maximum component carrier bandwidth associated with the network access device; receiving, from the network access device, a second indication including an assignment bandwidth for a broadcast message, the assignment bandwidth being within the supported bandwidth capability of the UE; receiving the broadcast message over a component carrier in accordance with the supported bandwidth capability of the UE and the assignment bandwidth for the broadcast message; and communicating with the network access device over the component carrier based at least in part on the broadcast message and the supported bandwidth capability of the UE.

In some examples, the method may include transmitting a third indication that the supported bandwidth capability of the UE is associated with at least one of: a link direction, a carrier frequency, or a combination thereof. In some examples, the method may include transmitting a third indication of a component configuration associated with the supported bandwidth capability of the UE, and the component configuration may include at least one of: a number of radio frequency (RF) chains, a number of power amplifiers of the UE, a maximum power parameter for at least one RF chain, a phase-locked loop (PLL) configuration of the number of RF chains, a Discrete Fourier Transform (DFT) size parameter of the UE, a dynamic frequency re-tuning parameter of the UE, or a combination thereof. In some examples, the supported bandwidth capability of the UE may include at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

In some examples, the second indication may include an assignment bandwidth for an indication of a Precoding Resource Block Group (PRG) used for channel estimation, and the assignment bandwidth for the indication of the PRG is within the supported bandwidth capability of the UE. In some examples, the second indication may include an assignment bandwidth of a subband for Channel Quality Information (CQI) feedback, the assignment bandwidth of the subband being within the supported bandwidth capability of the UE, and the method may include transmitting, to the network access device, the CQI feedback within the supported bandwidth capability of the UE. In some examples, the second indication may include an assignment bandwidth for a Sounding Reference Signal (SRS) transmission, the assignment bandwidth for the SRS transmission being within the supported bandwidth capability of the UE, and the method may include transmitting, to the network access device, the SRS transmission within the supported bandwidth capability of the UE. In some examples, the second indication may include a downlink reference signal (RS) indicating one or more boundaries of network access device radio frequency (RF) component bandwidths, and the method may include estimating a phase offset based at least on one of the received one or more boundaries, and performing a coherent positioning operation based on the estimated phase offset.

In some examples, the supported bandwidth capability of the UE may be specified as a set of values providing a frequency granularity. In some examples, the network access device RF component bandwidths may be specified as a set of values providing a frequency granularity. In some examples, the method may include receiving a transmission over a wideband component carrier (CC) using a set of radio frequency chains configured to perform an intra-band contiguous carrier aggregation for different frequency ranges of the wideband CC. In some examples, the assignment bandwidth may be associated with communication based at least in part on: a carrier frequency, a waveform type, or a combination thereof. In some examples the first indication of the supported bandwidth capability may include at least one boundary between a pair of radio frequency chains of the UE. In some examples, the communicating may include performing at least one of a downlink communication, an uplink communication, or a sidelink communication based at least in part on the at least one boundary. In some examples, the communicating may include determining that a signal or channel associated with the assignment bandwidth overlaps a boundary of the at least one boundary, and refraining from communication based on the signal or the channel.

In one example, a method for wireless communication at a UE is described. The method may include transmitting, to a network access device, a first indication of a supported bandwidth capability of the UE and a second indication of a component configuration associated with the supported bandwidth capability of the UE, and communicating with the network access device based at least in part on the supported bandwidth capability of the UE and the component configuration of the UE.

In some examples, the component configuration may include a first RF chain and a second RF chain associated with a single power amplifier, and no support for dynamic frequency re-tuning for the first RF chain and the second RF chain, the method may include receiving a third indication of an assignment bandwidth for a Discrete Fourier Transform-Spread-Orthogonal Frequency Division Multiplexing (DFT-S-OFDM) waveform, the assignment bandwidth spanning a first bandwidth of the first RF chain and a second bandwidth of the second RF chain; and performing separate Discrete Fourier Transform (DFT) operations on first and second portions of the DFT-S-OFDM waveform received using the first RF chain and the second RF chain. In some examples, the component configuration may include a first RF chain associated with a first power amplifier, a second RF chain associated with a second power amplifier, and no support for dynamic frequency re-tuning for the first RF chain and the second RF chain, and the method may include receiving a third indication of an assignment bandwidth for a Discrete Fourier Transform-Spread-Orthogonal Frequency Division Multiplexing (DFT-S-OFDM) waveform, the assignment bandwidth spanning a first bandwidth of the first RF chain and a second bandwidth of the second RF chain; performing a single Discrete Fourier Transform (DFT) operation on the DFT-S-OFDM waveform using the first RF chain and the second RF chain; and performing separate DFT cluster operations on the DFT-S-OFDM waveform using the first RF chain and the second RF chain, in which a first DFT cluster associated with the first RF chain and a second DFT cluster associated with the second RF chain are contiguous in phase and resource allocation.

In some examples, the component configuration may include a first RF chain associated with a first power amplifier, a second RF chain associated with a second power amplifier, support for dynamic frequency re-tuning for at least one of the first RF chain or the second RF chain, and no support for non-contiguous aggregate RF chain bandwidth, and the method may include receiving a third indication of a contiguous assignment bandwidth for a Discrete Fourier Transform-Spread-Orthogonal Frequency Division Multiplexing (DFT-S-OFDM) waveform, the contiguous assignment bandwidth associated with a bandwidth less than or equal to an aggregate bandwidth of the UE included in the supported bandwidth capability of the UE, and the contiguous assignment bandwidth spanning a first bandwidth of the first RF chain and a second bandwidth of the second RF chain; frequency re-tuning at least one of the first bandwidth or the second bandwidth based at least in part on the contiguous assignment bandwidth; performing, after the frequency re-tuning, a single Discrete Fourier Transform (DFT) operation on the DFT-S-OFDM waveform using the first RF chain and the second RF chain; and performing separate DFT cluster operations on the DFT-S-OFDM waveform using the first RF chain and the second RF chain, in which a first DFT cluster associated with the first RF chain and a second DFT cluster associated with the second RF chain are contiguous in phase and resource allocation.

In some examples, the component configuration may include a first RF chain associated with a first power amplifier, a second RF chain associated with a second power amplifier, support for dynamic frequency re-tuning for at least one of the first RF chain or the second RF chain, and support for non-contiguous aggregate RF chain bandwidth, the method further including receiving a third indication of a non-contiguous assignment bandwidth for a Discrete Fourier Transform-Spread-Orthogonal Frequency Division Multiplexing (DFT-S-OFDM) waveform, the non-contiguous assignment bandwidth associated with a bandwidth less than or equal to an aggregate RF chain bandwidth of the UE included in the supported bandwidth capability of the UE, and the non-contiguous assignment bandwidth spanning a first bandwidth of the first RF chain and a second bandwidth of the second RF chain; frequency re-tuning at least one of the first bandwidth or the second bandwidth based at least in part on the non-contiguous assignment bandwidth; performing, after the frequency re-tuning, a single Discrete Fourier Transform (DFT) operation on the DFT-S-OFDM waveform using the first RF chain and the second RF chain; and performing separate DFT cluster operations on the DFT-S-OFDM waveform using the first RF chain and the second RF chain, in which a first DFT cluster associated with the first RF chain and a second DFT cluster associated with the second RF chain are contiguous in phase and resource allocation.

In one example, an apparatus for wireless communication at a UE is described. The apparatus may include means for transmitting, to a network access device, a first indication of a supported bandwidth capability of the UE, the supported bandwidth capability of the UE being less than a maximum component carrier bandwidth associated with the network access device; means for receiving, from the network access device, a second indication including an assignment bandwidth for a broadcast message, the assignment bandwidth being within the supported bandwidth capability of the UE; means for receiving the broadcast message over a component carrier in accordance with the supported bandwidth capability of the UE and the assignment bandwidth for the broadcast message; and means for communicating with the network access device over the component carrier based at least in part on the broadcast message and the supported bandwidth capability of the UE.

In some examples, the apparatus may include means for transmitting a third indication that the supported bandwidth capability of the UE is associated with at least one of: a link direction, a carrier frequency, or a combination thereof. In some examples, the apparatus may include means for transmitting a third indication of a component configuration associated with the supported bandwidth capability of the UE, and the component configuration may include at least one of: a number of radio frequency (RF) chains, a number of power amplifiers of the UE, a maximum power parameter for at least one RF chain, a phase-locked loop (PLL) configuration of the number of RF chains, a Discrete Fourier Transform (DFT) size parameter of the UE, a dynamic frequency re-tuning parameter of the UE, or a combination thereof. In some examples, the supported bandwidth capability of the UE may include at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

In some examples, the second indication may include an assignment bandwidth for an indication of a Precoding Resource Block Group (PRG) used for channel estimation, and the assignment bandwidth for the indication of the PRG is within the supported bandwidth capability of the UE. In some examples, the second indication may include an assignment bandwidth of a subband for Channel Quality Information (CQI) feedback, and the assignment bandwidth of the subband is within the supported bandwidth capability of the UE, the apparatus further including means for transmitting, to the network access device, the CQI feedback within the supported bandwidth capability of the UE. In some examples, the second indication may include an assignment bandwidth for a Sounding Reference Signal (SRS) transmission, and the assignment bandwidth for the SRS transmission is within the supported bandwidth capability of the UE, the apparatus further including means for transmitting, to the network access device, the SRS transmission within the supported bandwidth capability of the UE. In some example, the second indication may include a downlink reference signal (RS) indicating one or more boundaries of network access device radio frequency (RF) component bandwidths, the apparatus further including means for estimating a phase offset based at least on one of the received one or more boundaries, and means for performing a coherent positioning operation based on the estimated phase offset.

In some examples, the supported bandwidth capability of the UE may be specified as a set of values providing a frequency granularity. In some examples, the network access device RF bandwidths may be specified as a set of values providing a frequency granularity. In some examples, the apparatus may include means for receiving a transmission over a wideband component carrier (CC) using a set of radio frequency chains configured to perform an intra-band contiguous carrier aggregation for different frequency ranges of the wideband CC. In some examples, the assignment bandwidth may be associated with communication based at least in part on: a carrier frequency, a waveform type, or a combination thereof. In some examples, the first indication of the supported bandwidth capability of the UE may include at least one boundary between a pair of radio frequency chains of the UE. In some examples, the means for communicating may include means for performing at least one of a downlink communication, an uplink communication, or a sidelink communication based at least in part on the at least one boundary. In some examples, the means for communicating may include means for determining that a signal or channel associated with the assignment bandwidth overlaps a boundary of the at least one boundary, and means for refraining from communication based on the signal or the channel.

In one example, an apparatus for wireless communication at a UE is described. The apparatus may include a processor, memory in electronic communication with the processor; and instructions stored in the memory. The instructions may be executable by the processor to: transmit, to a network access device, a first indication of a supported bandwidth capability of the UE, the supported bandwidth capability of the UE being less than a maximum component carrier bandwidth associated with the network access device; receive, from the network access device, a second indication including an assignment bandwidth for a broadcast message, the assignment bandwidth being within the supported bandwidth capability of the UE; receive the broadcast message over a component carrier in accordance with the supported bandwidth capability of the UE and the assignment bandwidth for the broadcast message; and communicate with the network access device over a component carrier based at least in part on the broadcast message and the supported bandwidth capability of the UE.

In some examples, the instructions may be further executable to transmit a third indication that the supported bandwidth capability of the UE is associated with at least one of: a link direction, a carrier frequency, or a combination thereof. In some examples, the instructions may be further executable to transmit a third indication of a component configuration associated with the supported bandwidth capability of the UE, the component configuration including at least one of: a number of radio frequency (RF) chains of the UE, a number of power amplifiers of the UE, a maximum power parameter for at least one RF chain of the UE, a phase-locked loop (PLL) configuration of the number of RF chains, a Discrete Fourier Transform (DFT) size parameter of the UE, a dynamic frequency re-tuning parameter of the UE, or a combination thereof. In some examples, the supported bandwidth capability of the UE may include at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

In some examples, the second indication may include an assignment bandwidth for an indication of a Precoding Resource Block Group (PRG) used for channel estimation, and the assignment bandwidth for the indication of the PRG is within the supported bandwidth capability of the UE. In some examples, the second indication may include an assignment bandwidth of a subband for Channel Quality Information (CQI) feedback, and the assignment bandwidth of the subband is within the supported bandwidth capability of the UE, and the instructions may be further executable to transmit, to the network access device, the CQI feedback within the supported bandwidth capability of the UE. In some examples, the second indication may include an assignment bandwidth for a Sounding Reference Signal (SRS) transmission, and the assignment bandwidth for the SRS transmission is within the supported bandwidth capability of the UE, the instructions further executable to transmit, to the network access device, the SRS transmission within the supported bandwidth capability of the UE. In some examples, the second indication may include a downlink reference signal (RS) indicating one or more boundaries of network access device radio frequency (RF) component bandwidths, the instructions further executable to estimate a phase offset based at least on one of the received one or more boundaries and at least one boundary within the supported bandwidth capability of the UE, and perform a coherent positioning operation based on the estimated phase offset.

In some examples, the supported bandwidth capability of the UE may be specified as a set of values providing a frequency granularity. In some examples, the network access device RF bandwidths may be specified as a set of values providing a frequency granularity. In some examples, the instructions may be further executable to receive a transmission over a wideband component carrier (CC) using a set of radio frequency (RF) chains configured to perform an intra-band contiguous carrier aggregation for different frequency ranges of the wideband CC. In some examples, the assignment bandwidth may be associated with communication based at least in part on: a carrier frequency, a waveform type, or a combination thereof. In some examples the first indication of the supported bandwidth capability of the UE may include at least one boundary between a pair of radio frequency chains of the UE. In some examples, the instructions may be further executable to perform at least one of a downlink communication, an uplink communication, or a sidelink communication based at least in part on the at least one boundary. In some examples, the instructions may be further executable to determine that a signal or channel associated with the assignment bandwidth overlaps a boundary of the at least one boundary, and refrain from communication based on the signal or the channel.

In one example, a non-transitory computer-readable medium storing code for wireless communication at a UE is described. The code may include instructions executable to: transmit, to a network access device, a first indication of a supported bandwidth capability of the UE, the supported bandwidth capability of the UE being less than a maximum component carrier bandwidth associated with the network access device; receive, from the network access device, a second indication including an assignment bandwidth for a broadcast message, the assignment bandwidth being within the supported bandwidth capability of the UE; receive the broadcast message over a component carrier in accordance with the supported bandwidth capability of the UE and the assignment bandwidth for the broadcast message; and communicate with the network access device over the component carrier based at least in part on the broadcast message and the supported bandwidth capability of the UE.

In one example, a method for wireless communication at a network access device is described. The method for wireless communication at the network access device may include receiving, from a user equipment (UE), a first indication of a supported bandwidth capability of the UE, the supported bandwidth capability of the UE being less than a maximum component carrier bandwidth associated with the network access device; transmitting, to the UE, a second indication including an assignment bandwidth for a broadcast message, the assignment bandwidth being within the supported bandwidth capability of the UE; transmitting the broadcast message over a component carrier in accordance with the supported bandwidth capability of the UE and the assignment bandwidth for the broadcast message; and communicating with the UE over the component carrier based at least in part on the broadcast message and the supported bandwidth capability of the UE.

In some examples, the second indication may include an assignment bandwidth for an indication of a Precoding Resource Block Group (PRG) used for channel estimation, and the assignment bandwidth for the indication of the PRG is within the supported bandwidth capability of the UE. In some examples, the second indication may include an assignment bandwidth of a subband for Channel Quality Information (CQI) feedback, and the assignment bandwidth of the subband is within the supported bandwidth capability of the UE, the method further including receiving from the UE the CQI feedback within the supported bandwidth capability of the UE. In some examples, the second indication may include an assignment bandwidth for a Sounding Reference Signal (SRS) transmission, and the assignment bandwidth for the SRS transmission is within the supported bandwidth capability of the UE, the method further including receiving from the UE the SRS transmission within the supported bandwidth capability of the UE. In some examples, the first indication may include an uplink reference signal (RS) indicating at least one boundary associated with the supported bandwidth capability of the UE, and the method may include estimating a phase offset based at least on the at least one boundary associated with the supported bandwidth capability of the UE and at least one boundary of the network access device radio frequency (RF) bandwidths; and performing a coherent positioning operation based on the estimated phase offset.

In some examples, the supported bandwidth capability of the UE may be specified as a set of values providing a frequency granularity. In some examples, the network access device RF bandwidths may be specified as a set of values providing a frequency granularity. In some examples, the supported bandwidth capability of the UE may include at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof. In some examples, the method may include receiving a third indication of a component configuration of the UE, the component configuration of the UE including at least one of: a number of radio frequency (RF) chains of the UE, a number of power amplifiers of the UE, a maximum power parameter for at least one RF chain of the UE, a phase-locked loop (PLL) configuration of the number of RF chains, a Discrete Fourier Transform (DFT) size parameter of the UE, a dynamic frequency re-tuning parameter of the UE, or a combination thereof. In some examples, the method may include receiving from the UE a third indication that the supported bandwidth capability of the UE is associated with at least one of: a link direction, a carrier frequency, or a combination thereof.

In some examples, the first indication of the supported bandwidth capability of the UE may include at least one uplink bandwidth boundary of the UE, and the method may include determining a channel estimation average or setting a DFT-S-OFDM waveform cluster boundary to be within an uplink bandwidth defined by the at least one uplink bandwidth boundary. In some examples, the assignment bandwidth may be associated with communication based at least in part on: a carrier frequency, a waveform type, or a combination thereof. In some examples, the first indication of the supported bandwidth capability of the UE may include at least one boundary between a pair of radio frequency chains of the UE, and the method may include identifying the at least one boundary. In some examples, the communicating may include performing at least one of a downlink communication or an uplink communication with the UE, or scheduling a sidelink communication for the UE, based at least in part on the at least one boundary. In some examples, the communicating may include refraining from scheduling or transmitting a signal or a channel with an assignment bandwidth that overlaps a boundary of the at least one boundary.

In one example, a method for wireless communication at a network access device is described. The method for wireless communication at the network access device may include receiving, from a user equipment (UE), a first indication of a supported bandwidth capability of the UE, and as second indication of a component configuration associated with the supported bandwidth capability of the UE, and communicating with the UE based at least in part on the supported bandwidth capability of the UE and the component configuration of the UE.

In some examples, the method may include receiving a third indication that the supported bandwidth capability of the is associated with at least one of: a link direction, a carrier frequency, or a combination thereof.

In one example, an apparatus for wireless communication at a network access device is described. The apparatus for wireless communication at the network access device may include means for receiving, from a user equipment (UE), a first indication of a supported bandwidth capability of the UE, the supported bandwidth capability of the UE being less than a maximum component carrier bandwidth associated with the network access device; means for transmitting to the UE a second indication including an assignment bandwidth for a broadcast message, the assignment bandwidth being within the supported bandwidth capability of the UE; means for transmitting the broadcast message over a component carrier in accordance with the supported bandwidth capability of the UE and the assignment bandwidth for the broadcast message; and means for communicating with the UE over the component carrier based at least in part on the broadcast message and the supported bandwidth capability of the UE.

In some examples, the second indication may include an assignment bandwidth for an indication of a Precoding Resource Block Group (PRG) used for channel estimation, and the assignment bandwidth for the indication of the PRG is within the supported bandwidth capability of the UE. In some examples, the second indication may include an assignment bandwidth of a subband for Channel Quality Information (CQI) feedback, and the assignment bandwidth of the subband is within the supported bandwidth capability of the UE, the apparatus further including means for receiving from the UE the CQI feedback within the supported bandwidth capability of the UE. In some examples, the second indication may include an assignment bandwidth for a Sounding Reference Signal (SRS) transmission, and the assignment bandwidth for the SRS transmission within the supported bandwidth capability of the UE, the apparatus further including means for receiving from the UE the SRS transmission within the supported bandwidth capability of the UE. In some examples, the first indication may include an uplink reference signal (RS) indicating at least one boundary associated with the supported bandwidth capability of the UE, the apparatus further including means for estimating a phase offset based at least on the at least one boundary associated with the supported bandwidth capability of the UE and at least one boundary of the network access device radio frequency (RF) bandwidths, means for performing a coherent positioning operation based on the estimated phase offset.

In some examples, the supported bandwidth capability of the UE may be specified as a set of values providing a frequency granularity. In some examples, the network access device RF bandwidths may be specified as a set of values providing a frequency granularity. In some examples, the supported bandwidth capability of the UE may include at least one of: a component bandwidth configuration, an aggregate bandwidth configuration of the UE, an indication of support for non-contiguous bandwidth within an aggregate bandwidth of the UE, at least one boundary within the supported bandwidth capability of the UE or a combination thereof. In some examples, the apparatus may include means for receiving from the UE a third indication that the supported bandwidth capability of the UE is associated with at least one of: a link direction, a carrier frequency, or a combination thereof. In some examples, the apparatus may include means for receiving a third indication of a component configuration associated with the supported bandwidth capability of the UE, and the component configuration may include at least one of: a number of radio frequency (RF) chains of the UE, a number of power amplifiers of the UE, a maximum power parameter for at least one RF chain of the UE, a phase-locked loop (PLL) configuration of the number of RF chains, a Discrete Fourier Transform (DFT) size parameter of the UE, a dynamic frequency re-tuning parameter of the UE, or a combination thereof.

In some examples, the first indication of the supported bandwidth capability of the UE may include at least one uplink bandwidth boundary associated with the supported bandwidth capability of the UE, the apparatus further including means for determining a channel estimation average or setting a DFT-S-OFDM waveform cluster boundary to be within an uplink bandwidth defined by the at least one uplink bandwidth boundary. In some examples, the assignment bandwidth may be associated with communication based at least in part on: a carrier frequency, a waveform type, or a combination thereof. In some examples, the first indication of the supported bandwidth capability of the UE may include at least one boundary between a pair of radio frequency chains of the UE, the apparatus further including means for identifying the at least one boundary. In some examples, the means for communicating may include means for performing at least one of a downlink communication or an uplink communication with the UE, or scheduling a sidelink communication for the UE, based at least in part on the at least one boundary. In some examples, the means for communicating may include means for refraining from scheduling or transmitting a signal or a channel with an assignment bandwidth that overlaps a boundary of the at least one boundary.

In one example, an apparatus for wireless communication at the network access device is described. The apparatus for wireless communication at the network access device may include a processor, memory in electronic communication with the processor; and instructions stored in the memory. The instructions may be executable by the processor to: receive, from a user equipment (UE), a first indication of a supported bandwidth capability of the UE, the supported bandwidth capability of the UE being less than a maximum component carrier bandwidth associated with the network access device; transmit, to the UE, a second indication including an assignment bandwidth for a broadcast message, the assignment bandwidth being within the supported bandwidth capability of the UE; transmit the broadcast message over a component carrier in accordance with the supported bandwidth capability of the UE and the assignment bandwidth for the broadcast message; and communicate with the network access device over the component carrier based at least in part on the broadcast message and the supported bandwidth capability of the UE.

In one example, a non-transitory computer-readable medium storing code for wireless communication at the network access device is described. The code may include instructions executable to: receive, from a user equipment (UE), a first indication of a supported bandwidth capability of the UE, the supported bandwidth capability of the UE being less than a maximum component carrier bandwidth associated with the network access device; transmit, to the UE, a second indication including an assignment bandwidth for a broadcast message, the assignment bandwidth being within the supported bandwidth capability of the UE; transmit the broadcast message over a component carrier in accordance with the supported bandwidth capability of the UE and the assignment bandwidth for the broadcast message; and communicate with the network access device over the component carrier based at least in part on the broadcast message and the supported bandwidth capability of the UE.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described in which a transmitting device, a receiving device, or a scheduling device (e.g., a network access device) may handle wide bandwidth communications. In a wireless communication system that supports wide bandwidth communications, some wireless devices in the wireless communication system may not include a RF chain that supports the wide bandwidth. For example, some wireless devices may not support a maximum carrier (or CC) bandwidth. In such wireless devices, it may be useful for wireless devices with which the wireless device communicates to receive an indication of the supported RF bandwidth capability of the wireless device and/or an RF component configuration of the wireless device. This information may be used to receive a transmission from the wireless device (e.g., to account for amplitude and phase discontinuities between different RF chains of the wireless device). The information may also be used to transmit to the wireless device, or to schedule transmissions of the wireless device, such that RF boundaries between different RF chains of the wireless device are not crossed or are accounted for).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Figure 1:
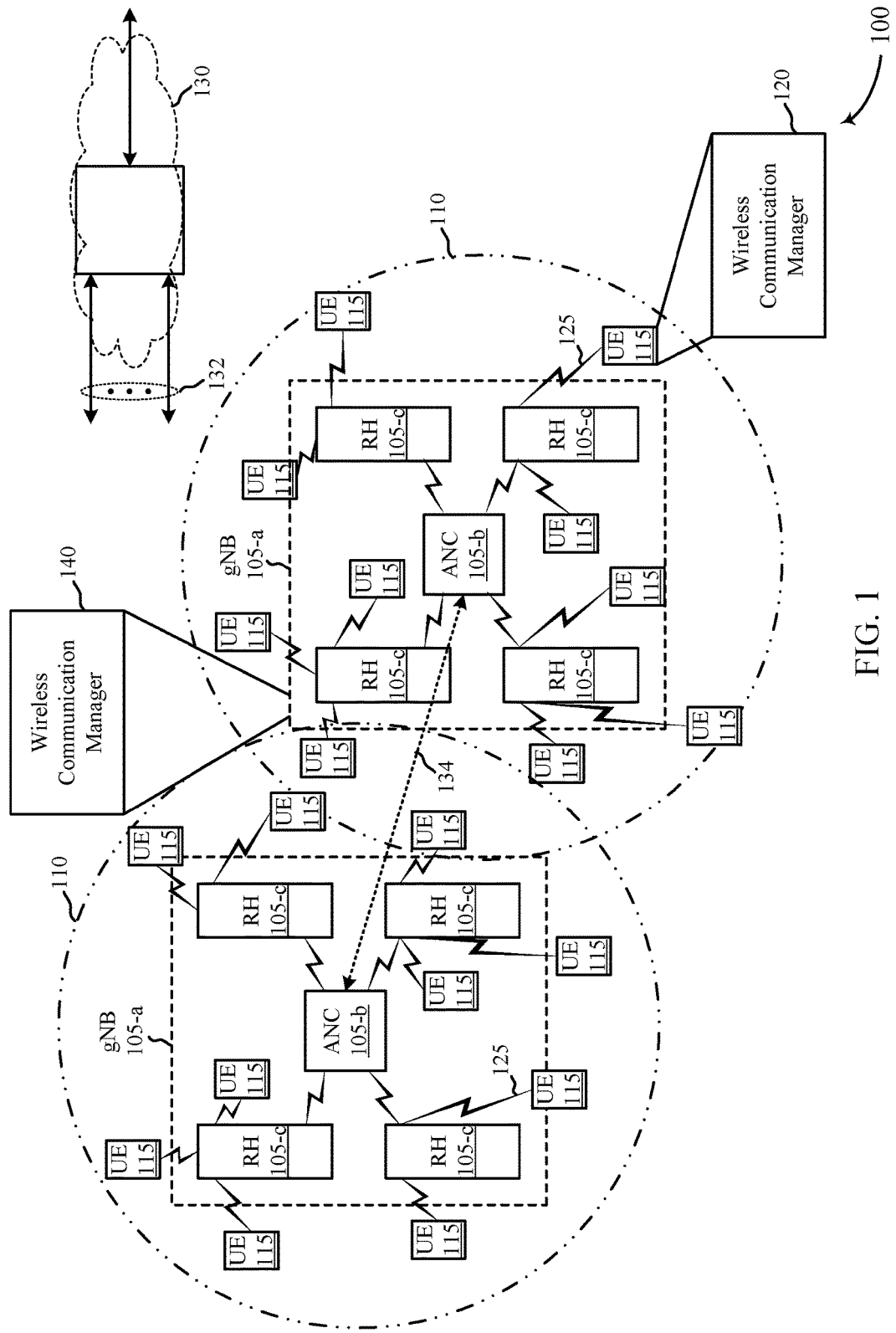
FIGS. 1-3 show examples of wireless communication systems, in accordance with various aspects of the present disclosure.

FIG. 1 shows an example of a wireless communication system 100, in accordance with various aspects of the present disclosure. The wireless communication system 100 may include network access devices 105 (e.g., gNBs 105-a, ANCs 105-b, and/or RHs 105-c), UEs 115, and a core network 130. The core network 130 may provide user authentication, access authorization, tracking, Internet Protocol (IP) connectivity, and other access, routing, or mobility functions. At least some of the network access devices 105 (e.g., gNBs 105-a or ANCs 105-b) may interface with the core network 130 through backhaul links 132 (e.g., S1, S2, etc.) and may perform radio configuration and scheduling for communication with the UEs 115. In various examples, the ANCs 105-b may communicate, either directly or indirectly (e.g., through core network 130), with each other over backhaul links 134 (e.g., X1, X2, etc.), which may be wired or wireless communication links. Each ANC 105-*b* may also communicate with a number of UEs 115 through a number of smart radio heads (e.g., RHs 105-*c*). In an alternative configuration of the wireless communication system 100, the functionality of an ANC 105-*b* may be provided by a radio head 105-*c* or distributed across the radio heads 105-*c* of an gNB 105-*a*. In another alternative configuration of the wireless communication system 100 (e.g., an LTE/LTE-A configuration), the radio heads 105-*c* may be replaced with base stations, and the ANCs 105-*b* may be replaced by base station controllers (or links to the core network 130). In some examples, the wireless communication system 100 may include a mix of radio heads 105-*c*, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. A gNB may support one or multiple (e.g., two, three, four, and the like) cells (e.g., component carriers).

The wireless communication system 100 may support synchronous or asynchronous operation. For synchronous operation, the gNBs 105-*a* and/or radio heads 105-*c* may have similar frame timing, and transmissions from different gNBs 105-*a* and/or radio heads 105-*c* may be approximately aligned in time. For asynchronous operation, the gNBs 105-*a* and/or radio heads 105-*c* may have different frame timings, and transmissions from different gNBs 105-*a* and/or radio heads 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-*c*, ANC 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of gNBs 105-*a*, radio heads 105-*c*, base stations, access points, or other network access devices, including macro gNBs, small cell gNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-*c*, and/or downlinks (DLs), from a radio head 105-*c* to a UE 115. The downlinks may also be called forward links, while the uplinks may also be called reverse links. Control information and data may be multiplexed on an uplink or downlink according to various techniques. Control information and data may be multiplexed on an uplink or downlink, for example, using TDM techniques, FDM techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., radio heads 105-*c*) and UEs 115 may include multiple antenna subarrays for employing antenna diversity schemes to improve communication quality and reliability between network access devices 105 and UEs 115. Additionally or alternatively, network access devices 105 and UEs 115 may employ MIMO techniques that may take advantage of multi-path environments to transmit multiple spatial layers carrying the same or different coded data. In some cases, signal processing techniques such as beamforming (e.g., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a UE 115 may include a wireless communication manager 120. The wireless communication manager 120 may be used to transmit, to a network access device 105, a first indication of a supported RF bandwidth capability of the UE 115 and a second indication of an RF component configuration of the UE 115 associated with the supported RF bandwidth capability of the UE 115. The wireless communication manager 120 may also be used to communicate with the network access device 105 based at least in part on the supported RF bandwidth capability of the UE 115 and the RF component configuration of the UE 115, as described for example with reference to FIGS. 2-12, 14, and 16.

In some examples, a network access device 105 may include a wireless communication manager 140. The wireless communication manager 140 may be used to receive, from a UE 115, a first indication of a supported RF bandwidth capability of the UE 115, and a second indication of an RF component configuration of the UE 115 associated with the supported RF bandwidth capability of the UE 115. The wireless communication manager 140 may also be used to communicate with the UE based at least in part on the supported RF bandwidth capability of the UE 115 and the RF component configuration of the UE 115, as described for example with reference to FIGS. 2-11, 13, 15, and 17.

Figure 2:
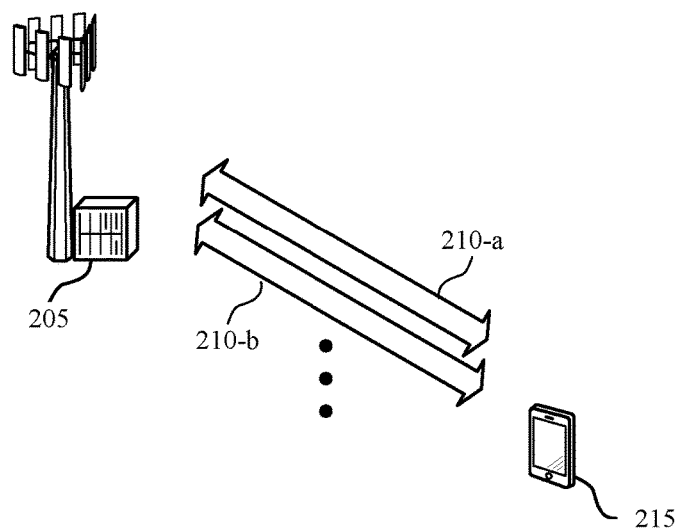

FIG. 2 shows an example of a wireless communication system 200, in accordance with various aspects of the present disclosure. The wireless communication system 200 may include a network access device 205 a UE 215, which may be examples of aspects of one or more of the network access devices or UEs described with reference to FIG. 1.

By way of example, the UE 215 is shown to communicate with the network access device 205, on a downlink and/or uplink, using multiple CCs 210 (e.g., a first CC 210-a and a second CC 210-b). The UE 215 (on a downlink) or the network access device 205 (on an uplink) may aggregate the CCs 210 in a CA mode of operation.

Figure 3:
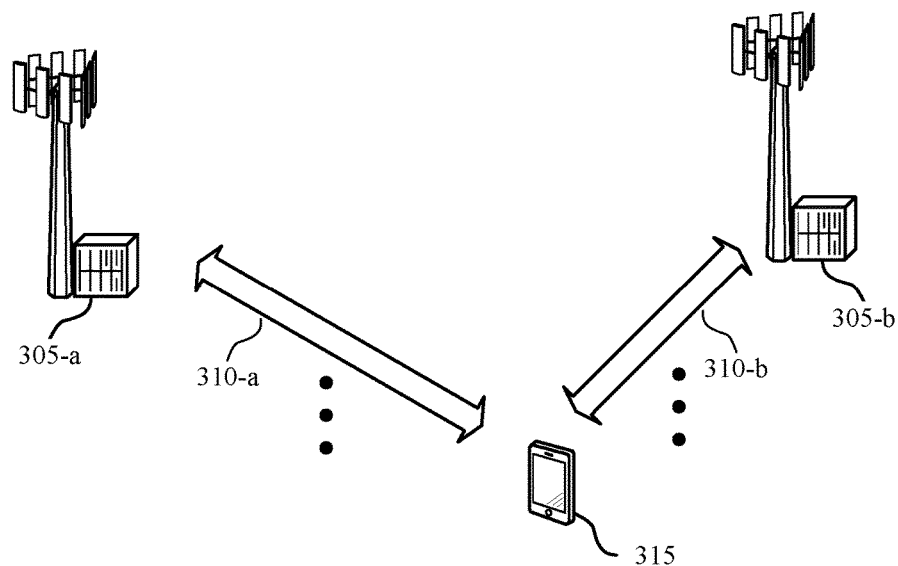

FIG. 3 shows an example of a wireless communication system 300, in accordance with various aspects of the present disclosure. The wireless communication system 300 may include a network access device 305 and, a first UE 315-a, and a second UE 315-b, which may be examples of aspects of one or more of the network access devices or UEs described with reference to FIGS. 1 and 2.

By way of example, the UE 315 is shown to communicate with the first network access device 305-a, on a downlink and/or uplink, using at least one CC 310 (e.g., at least a first CC 310-a). The UE 315 is also shown to communicate with the second network access device 305-b, on a downlink and/or uplink, using at least one CC 310 (e.g., at least a second CC 310-b). The UE 315 (on a downlink) may aggregate the CCs 310 in a CA mode of operation. Assuming the first network access device 305-a is the primary network access device for the UE 315, the first network access device 305-a may receive, from the second network access device 305-b, signals or data that the UE 315 transmits on the second CC 310-b. The signals or data may be received at the first network access device 305-a, from the second network access device 305-b, over a backhaul link between the first network access device 305-a and the second network access device 305-b. The first network access device 305-a may use the signals or data received from the second network access device 305-b to aggregate the CCs 310 on an uplink.

Figure 4:
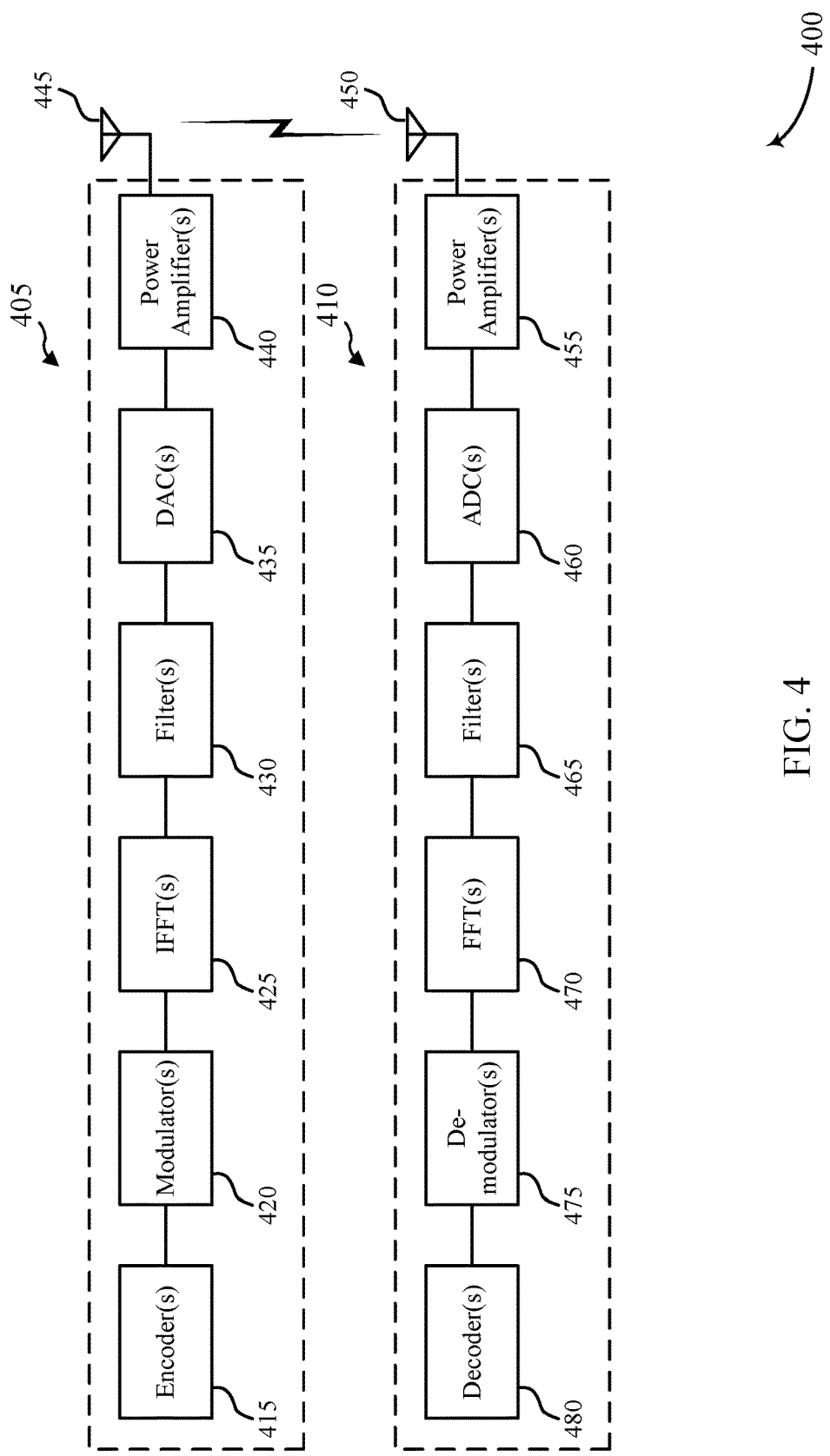
FIG. 4 shows examples of RF component configurations for a transmitting device and a receiving device, in accordance with various aspects of the present disclosure.

FIG. 4 shows examples of RF component configurations 400 for a transmitting device 405 and a receiving device 410, in accordance with various aspects of the present disclosure. Each of the transmitting device 405 and the receiving device 410 may be an example of aspects of the network access devices or UEs described with reference to FIGS. 1-3.

The RF component configuration for the transmitting device 405 may include one or more encoders 415, modulators 420, Inverse Fast Fourier Transform (IFFT) processors 425, filters 430, digital-to-analog converters (DACs) 435, power amplifiers 440, or antennas 445. In some examples, the components shown may be replicated for each RF chain of the transmitting device 405. In other examples, one or more of the components may be shared by RF chains of the transmitting device 405.

The RF component configuration for the receiving device 410 may include one or antennas 450, power amplifiers 455, analog-to-digital converters (ADCs) 460, filters 465, Fast Fourier Transform (FFT) processors 470, demodulators 475, or decoders 480. In some examples, the components shown may be replicated for each RF chain of the receiving device 410. In other examples, one or more of the components may be shared by RF chains of the receiving device 410.

In some examples, a wireless device (e.g., a network access device or UE) operating in accordance with a multi-carrier mode (e.g., in accordance with aspects of a CA or dual connectivity mode, as described with reference to FIGS. 2 and 3) may communicate on 8, 16, 32, or some other number of CCs in parallel. In some example, the FFT size associated with the multiple carriers may be 8192, 4096, or 2048, with the FFT size being inversely proportional to the number of CCs.

In some examples, the number of CCs over which a UE may communicate in a multi-carrier mode may depend on the maximum channel bandwidth (or CC bandwidth (CC BW)) of the CCs. For example, a UE may communicate over 8 or 16 CCs when each CC has a CC BW greater than or equal to 400 MHz and less than or equal to 1000 MHz, or a UE may communicate over 16 or 32 CCs when each CC has a CC BW less than or equal to 100 MHz.

In an LTE/LTE-A network, a carrier (or CC) may have a maximum channel bandwidth of up to 20 MHz. In a next generation, NR, 5G, or mmW network, a carrier (or CC) may have a maximum channel bandwidth of 400 MHz, 800 MHz, 1 GHz, or greater. In some cases, a next generation, NR, or 5G network may provide a sub-6 GHz frequency band (or bands) and an above-6 GHz (or mmW) frequency band (or bands) in which wireless devices may operate. In these cases, the carriers (or CCs) in the sub-6 GHz and above-6 GHz frequency band (or bands) may have different maximum channel bandwidths. For example, a carrier (or CC) in the sub-6 GHz frequency band (or bands) may have a maximum channel bandwidth of 100 MHz, and a carrier (or CC) in the above-6 GHz frequency band (or bands) may have a maximum channel bandwidth of greater than 100 MHz. In some cases, a wireless communication system may support a scalable channel bandwidth.

Some wireless devices (e.g., network access devices 105 or UEs 115) may not be capable of supporting the maximum channel bandwidth of a carrier (or CC) in a next generation, NR, 5G, or mmW network, or may not be capable of supporting the maximum channel bandwidth of a carrier (or CC) using a single RF chain. For example, a network access device 105 may support a carrier (or CC) having a maximum channel bandwidth of 200 MHz or 1000 MHz, but some UEs 115 may support a maximum carrier (or CC) bandwidth of just 20 MHz, 40 MHz, or 80 MHz; or a network access device 105 may support a carrier (or CC) having a maximum channel bandwidth of 200 MHz, but some UEs 115 may only be able to support a 200 MHz carrier (or CC) bandwidth using more than one RF chain. FIGS. 5-9 show various scenarios in which a network access device and UE support a carrier (or CC) bandwidth using one or more RF chains, and in some cases, different numbers of RF chains.

Figure 5:
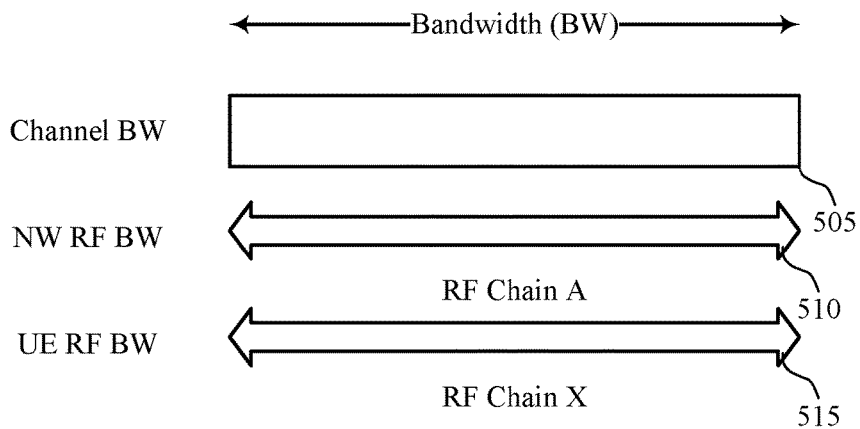
FIGS. 5-10 show example component configurations of network access devices and UEs that support an arbitrary Channel Bandwidth (e.g., a carrier bandwidth or CC BW), in accordance with various aspects of the present disclosure.

FIG. 5 shows example component configurations 500 of a network access device and UE that support an arbitrary Channel Bandwidth (e.g., a carrier bandwidth or CC BW) 505, in accordance with various aspects of the present disclosure. The network access device and UE may be examples of aspects of one or more of the network access devices or UEs described with reference to FIGS. 1-4.

As shown in FIG. 5, the network access device may support the Channel Bandwidth 505 using a single RF chain (e.g., an RF Chain A) having a bandwidth capability (e.g., a NW RF BW capability) 510 equal to or greater than the Channel BW 505. Similarly, the UE may support the Channel BW 505 using a single RF chain (e.g., an RF Chain X) having a bandwidth capability (e.g., a UE RF BW capability) 515 equal to or greater than the Channel BW 505.

Figure 6:
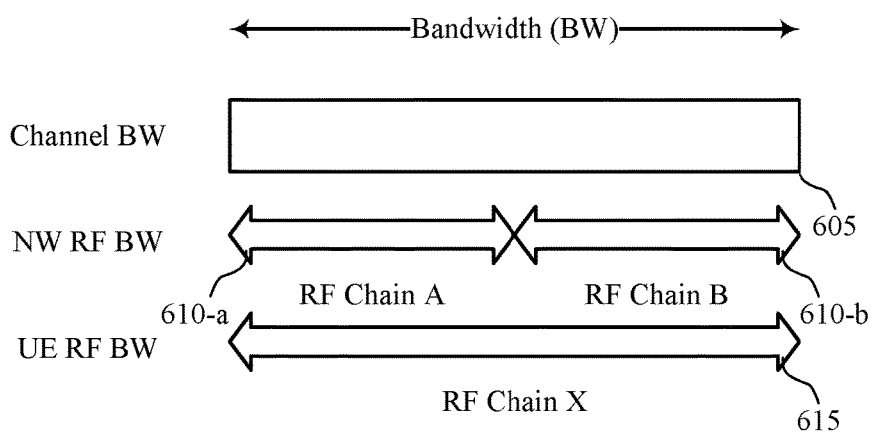

FIG. 6 shows example component configurations 600 of a network access device and UE that support an arbitrary Channel Bandwidth (e.g., a carrier bandwidth or CC BW) 605, in accordance with various aspects of the present disclosure. The network access device and UE may be examples of aspects of one or more of the network access devices or UEs described with reference to FIGS. 1-4.

As shown in FIG. 6, the network access device may support the Channel BW 605 using a first RF chain (e.g., an RF Chain A) having a first bandwidth capability 610-$a$ and a second RF chain (e.g., an RF Chain B) having a second bandwidth capability 610-$b$, in which the first bandwidth capability 610-$a$ and the second bandwidth capability 610-$b$ together provide a NW RF BW capability 610 equal to or greater than the Channel BW 605. The UE may support the Channel BW 605 using a single RF chain (e.g., an RF Chain X) having a bandwidth capability (e.g., a UE RF BW capability) 615 equal to or greater than the Channel BW 605.

Figure 7:
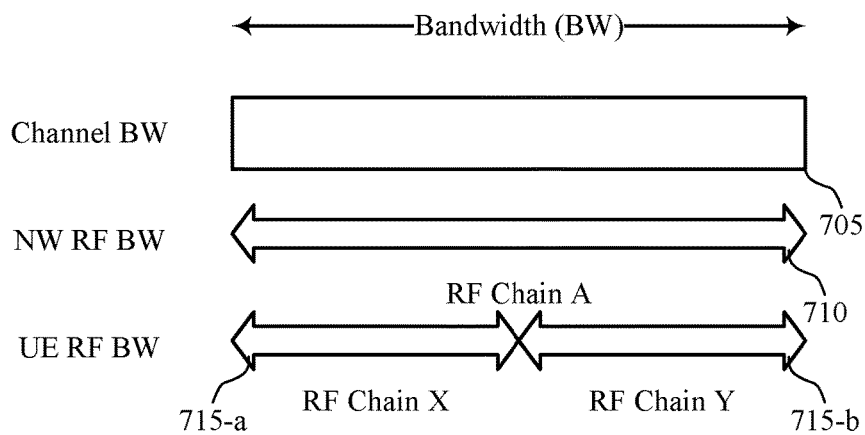

FIG. 7 shows example component configurations 700 of a network access device and UE that support an arbitrary Channel Bandwidth (e.g., a carrier bandwidth or CC BW) 705, in accordance with various aspects of the present disclosure. The network access device and UE may be examples of aspects of one or more of the network access devices or UEs described with reference to FIGS. 1-4.

As shown in FIG. 7, the network access device may support the Channel BW 705 using a single RF chain (e.g., an RF Chain A) having a bandwidth capability (e.g., a NW RF BW capability) 710 equal to or greater than the Channel BW 705. The UE may support the Channel BW 705 using a first RF chain (e.g., an RF Chain X) having a first bandwidth capability 715-$a$ and a second RF chain (e.g., an RF Chain Y) having a second bandwidth capability 715-$b$, in which the first bandwidth capability 715-$a$ and the second bandwidth capability 715-$b$ together provide a UE BW capability 715 equal to or greater than the Channel BW 705.

Figure 8:
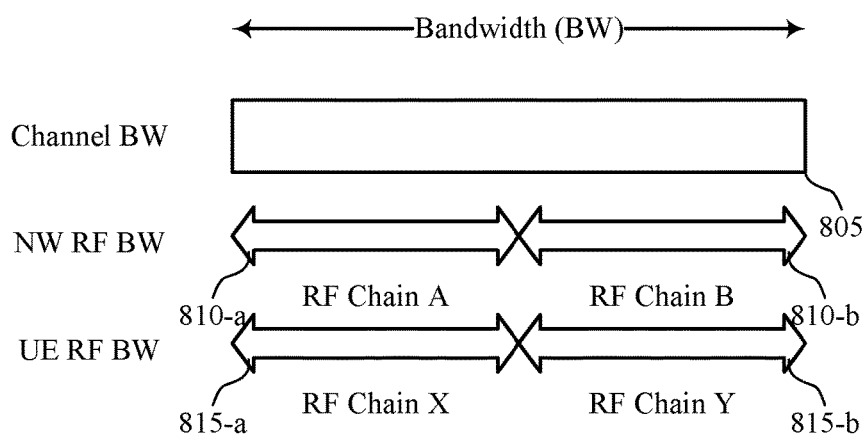

FIG. 8 shows example component configurations 800 of a network access device and UE that support an arbitrary Channel Bandwidth (e.g., a carrier bandwidth or CC BW) 805, in accordance with various aspects of the present disclosure. The network access device and UE may be examples of aspects of one or more of the network access devices or UEs described with reference to FIGS. 1-4.

As shown in FIG. 8, the network access device may support the Channel BW 805 using a first RF chain (e.g., an RF Chain A) having a first bandwidth capability 810-$a$ and a second RF chain (e.g., an RF Chain B) having a second bandwidth capability 810-$b$, in which the first bandwidth capability 810-$a$ and the second bandwidth capability 810-$b$ together provide a NW RF BW capability 810 equal to or greater than the Channel BW 805. Similarly, the UE may support the Channel BW 805 using a first RF chain (e.g., an RF Chain X) having a first bandwidth capability 815-$a$ and a second RF chain (e.g., an RF Chain Y) having a second bandwidth capability 815-$b$, in which the first bandwidth capability 815-$a$ and the second bandwidth capability 815-$b$ together provide a UE RF BW capability 815 equal to or greater than the Channel BW 805.

In some examples, a UE that supports the UE RF BW capability 515 or 615 described with reference to FIG. 5 or 6 may operate in a single-carrier mode. Similarly, a network access device that supports the NW RF BW capability 510 or 710 described with reference to FIG. 5 or 7 may operate in a single-carrier mode. In some examples, a UE that supports the UE RF BW capability 715 or 815 described with reference to FIG. 7 or 8 may operate in accordance with a multi-carrier mode (e.g., in accordance with aspects of a CA or dual connectivity mode, as described with reference to FIGS. 2 and 3). Similarly, a network access device that supports the NW RF BW capability 610 or 810 described with reference to FIG. 6 or 8 may operate in accordance with a multi-carrier mode.

For purposes of the present disclosure, a "Device RF BW" (e.g., a NW RF BW or a UE RF BW) is a bandwidth over which a device can transmit or receive a continuous waveform with phase and amplitude continuity (e.g., a RF chain bandwidth). A "Device Aggregated RF BW" is a bandwidth over which a device can transmit or receive signals, but not necessarily with phase and amplitude continuity. A "CC BW" is a bandwidth over which a waveform is defined, and may be greater than a Device RF BW of a receiving device, but should generally not be greater than a Device RF BW of a transmitting device. An "Aggregated CC BW" is a bandwidth of a plurality of CCs used in a multi-carrier mode (e.g., a CA or dual connectivity mode).

In a next generation, NR, 5G, or mmW network in which the maximum CC BW is greater than 100 MHz, a UE may be configured to receive or transmit over a single wideband CC using multiple RF chains (e.g., RF receive chains or RF transmit chains), as shown in FIG. 7. Alternatively, a UE may be configured with intra-band contiguous CA in a CC that is also configured as a wideband CC for one or more other UEs.

When a UE is configured to receive or transmit over a single wideband CC using multiple RF chains (e.g., RF receive chains or RF transmit chains), the UE may signal downlink (DL) Device RF BW boundaries of the UE (e.g., at least one downlink RF chain bandwidth boundary) and/or uplink (UL) Device RF BW boundaries of the UE (e.g., at least one uplink RF chain bandwidth boundary) to a network access device. In a downlink context, the network access device may not need to know the DL Device RF BW boundaries of the UE if the only impact to the UE is receive phase/amplitude discontinuity at the DL Device RF BW boundaries. However, if RF chains of the UE may be individually activated or deactivated, the network access device may need to know the DL Device RF BW boundaries of the UE. In an uplink context, the network access device may need to know the UL Device RF BW boundaries of the UE in order to ensure that channel estimation averaging does not cross the UL Device RF BW boundaries, or to ensure that DFT-S-OFDM waveform cluster boundaries do not cross the UL Device RF BW boundaries.

In a next generation, NR, or 5G network, both Cyclic Prefix Orthogonal Frequency-Division Multiplexing (CP-OFDM) and DFT-S-OFDM waveforms may be supported. CP-OFDM waveforms may support Single-Input Multiple-Output (SIMO) and MIMO transmissions. DFT-S-OFDM waveforms may just support Rank 1 transmissions. DFT-S-OFDM waveforms may be further limited to a subset of possible modulation and coding schemes (MCSs), or to particular assignment bandwidths. For example, a DFT-S-OFDM waveform may not support higher MCSs, or may be associated with a reduced maximum assignment bandwidth (e.g., 20 MHz) in some frequency bands (e.g., in a sub-6 GHz frequency band). In some cases, the reduced maximum assignment bandwidth may be less than a Device RF BW (e.g., a RF chain bandwidth). A DFT-S-OFDM waveform may not be associated with a reduced maximum assignment bandwidth in other frequency bands (e.g., in a mmW band).

In some examples, a network access device having a NW RF BW capability (i.e., a supported RF BW capability of the network access device) may communicate with a UE having a UE RF BW capability (i.e., a supported RF BW capability of the UE). The UE RF BW capability may be the same as, or different from, the NW RF BW capability. A network access device may also communicate with UEs having different UE RF BW capabilities. In some cases, one or both of the NW RF BW capability or a UE RF BW capability may support a same or different bandwidth as a CC BW. In some cases, an aggregated NW RF BW of the network access device may or may not match an aggregated UE RF BW of a UE.

In some examples, the NW RF BW capability or UE RF BW capability may include an RF chain bandwidth configuration (e.g., a Device RF BW configuration), an aggregate RF bandwidth (e.g., a Device Aggregated RF BW), an indication of support for non-contiguous bandwidth within the aggregate RF bandwidth, at least one RF bandwidth boundary (e.g., a boundary between RF chains), or a combination thereof.

In some examples, a network access device having a first RF component configuration (e.g., a first configuration of one or more RF chains) may communicate with a UE having a second RF component configuration (e.g., a second configuration of one or more RF chains). The first and second RF component configurations may be the same, similar, or different (e.g., the same, similar, or different in terms of numbers of RF chains, numbers of power amplifiers, maximum power parameters for RF chains, PLL configurations of the RF chains, DFT size parameters, dynamic frequency re-tuning parameters, or combinations thereof).

In some examples, a supported RF bandwidth capability (e.g., a NW RF BW capability or a UE RF BW capability) or a RF component configuration (e.g., an RF component configuration of a network access device or a UE) may be associated with at least one of a link direction (e.g., a downlink, an uplink, or a P2P link (e.g., a sidelink)) of a carrier frequency (e.g., sub-6 GHz or above-6 GHz (e.g., mmW)).

Figure 9:
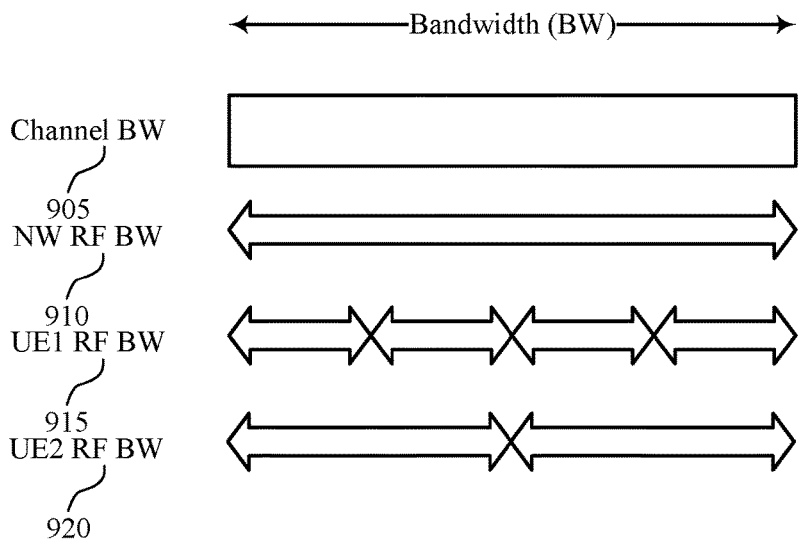

FIG. 9 shows example component configurations 900 of a network access device and UEs that support an arbitrary Channel Bandwidth (e.g., a carrier bandwidth or CC BW) 905, in accordance with various aspects of the present disclosure. The network access device and UEs may be examples of aspects of one or more of the network access devices or UEs described with reference to FIGS. 1-4.

As shown in FIG. 9, the network access device may support the Channel BW 905 using a single RF chain (e.g., an RF Chain A) having a bandwidth capability (e.g., a NW RF BW capability) 910 equal to or greater than the Channel BW 905. A first UE may support the Channel BW 905 using first and second RF chains having an aggregated bandwidth that provides a UE RF BW capability 915 equal to or greater than the Channel BW 905. A second UE may support the Channel BW 905 using first, second, third, and fourth RF chains having an aggregated bandwidth that provides a UE RF BW capability 920 equal to or greater than the Channel BW 905.

Figure 10:
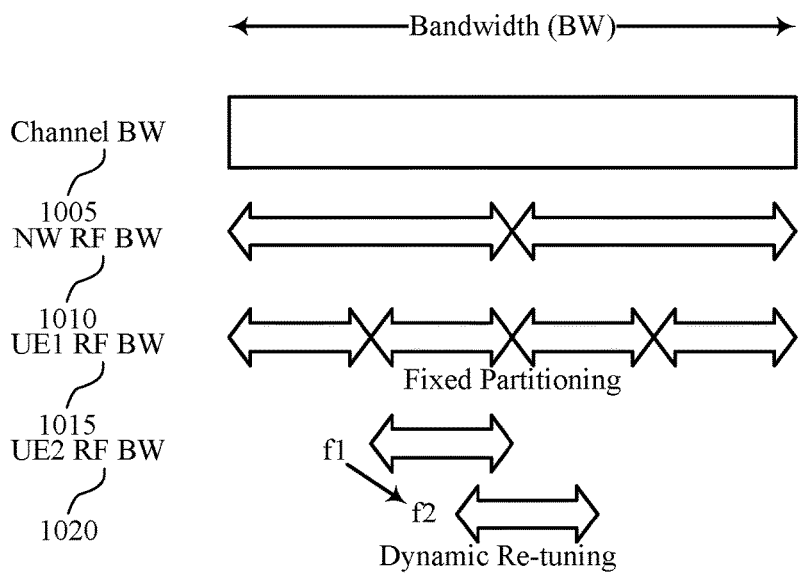

FIG. 10 shows example component configurations 1000 of a network access device and UEs that support an arbitrary Channel Bandwidth (e.g., a carrier bandwidth or CC BW) 1005, in accordance with various aspects of the present disclosure. The network access device and UEs may be examples of aspects of one or more of the network access devices or UEs described with reference to FIGS. 1-4.

As shown in FIG. 10, the network access device may support the Channel BW 1005 using a single RF chain (e.g., an RF Chain A) having a bandwidth capability (e.g., a NW RF BW capability) 1010 equal to or greater than the Channel BW 1005. A first UE (UE1) may support the Channel BW 1005 using first, second, third, and fourth RF chains having fixed bandwidth partitions. The first, second, third, and fourth RF chains may have an aggregated bandwidth that provides a UE1 RF BW capability 1015 equal to or greater than the Channel BW 1005. A second UE (UE2) may support part or all of the Channel BW 1005 using at least one RF chain having a bandwidth (or UE2 RF BW capability 1020) that may be dynamically frequency re-tuned (e.g., from a frequency f1 to a frequency f2).

In one example of the first UE described with reference to FIG. 10, the first UE may have an RF component configuration that includes a first RF chain and a second RF chain associated with a single power amplifier, and no support (or limited support) for dynamic frequency re-tuning for the first RF chain and the second RF chain. In this example, the first UE may receive an assignment bandwidth for a DFT-S-OFDM waveform, in which the assignment bandwidth spans a first RF bandwidth of the first RF chain and a second RF bandwidth of the second RF chain (i.e., an assignment bandwidth that spans an RF boundary between the first RF chain and the second RF chain). In these examples, the first UE may perform separate DFT operations on first and second portions of the DFT-S-OFDM waveform received using the first RF chain and the second RF chain.

In another example of the first UE described with reference to FIG. 10, the first UE may have an RF component configuration that includes a first RF chain associated with a first power amplifier, a second RF chain associated with a second power amplifier, and no support for dynamic frequency re-tuning for the first RF chain and the second RF chain. In this example, the first UE may receive an assignment bandwidth for a DFT-S-OFDM waveform, in which the assignment bandwidth spans a first RF bandwidth of the first RF chain and a second RF bandwidth of the second RF chain (i.e., an assignment bandwidth that spans an RF boundary between the first RF chain and the second RF chain). In these examples, the first UE may perform a single DFT operation on the DFT-S-OFDM waveform using the first RF chain and the second RF chain, and may perform separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

In an example of the second UE described with reference to FIG. 10, the second UE may have an RF bandwidth capability that includes an aggregate RF bandwidth with no support for non-contiguous aggregate RF chain bandwidth (e.g., an aggregate RF chain bandwidth of 200 MHz), and an RF component configuration that includes a first RF chain associated with a first power amplifier, a second RF chain associated with a second power amplifier, and support for dynamic frequency re-tuning for at least one of the first RF chain or the second RF chain. In this example, the second UE may receive a contiguous assignment bandwidth for a DFT-S-OFDM waveform, in which the contiguous assignment bandwidth is associated with an RF bandwidth less than or equal to the aggregate RF bandwidth of the UE. The assignment bandwidth may span a first RF bandwidth of the first RF chain and a second RF bandwidth of the second RF chain (i.e., the assignment bandwidth may span an RF boundary between the first RF chain and the second RF chain). In these examples, the first UE may frequency re-tune at least one of the first RF bandwidth or the second RF bandwidth; perform a single DFT operation on the DFT-S-OFDM waveform using the first RF chain and the second RF chain; and perform separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation. When performing the frequency re-tuning, the first RF bandwidth (e.g., a 100 MHz bandwidth) of the first RF chain and the second RF bandwidth (e.g., a 100 MHz bandwidth) of the second RF chain must remain contiguous, and must satisfy the second UE's aggregate RF bandwidth limitation.

In another example of the second UE described with reference to FIG. 10, the second UE may have an RF bandwidth capability that includes an aggregate RF bandwidth with support for non-contiguous aggregate RF chain bandwidth (e.g., an aggregate RF chain bandwidth of 200 MHz that may span a bandwidth of greater than 200 MHz), and an RF component configuration that includes a first RF chain associated with a first power amplifier, a second RF chain associated with a second power amplifier, and support for dynamic frequency re-tuning for at least one of the first RF chain or the second RF chain. In this example, the second UE may receive a non-contiguous assignment bandwidth for a DFT-S-OFDM waveform, in which the non-contiguous assignment bandwidth is associated with an RF bandwidth less than or equal to the aggregate RF bandwidth of the UE. The assignment bandwidth may span a first RF bandwidth of the first RF chain and a second RF bandwidth of the second RF chain (i.e., the assignment bandwidth may span an RF boundary between the first RF chain and the second RF chain). In these examples, the first UE may frequency re-tune at least one of the first RF bandwidth or the second RF bandwidth; perform a single DFT operation on the DFT-S-OFDM waveform using the first RF chain and the second RF chain; and perform separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation. When performing the frequency re-tuning, the first RF bandwidth (e.g., a 100 MHz bandwidth) of the first RF chain and the second RF bandwidth (e.g., a 100 MHz bandwidth) of the second RF chain need not remain contiguous, but must satisfy the second UE's aggregate RF bandwidth limitation.

When a UE (e.g., the first UE or the second UE described with reference to FIG. 10) is capable of supporting a 200 MHz uplink CC BW using a first 100 MHz RF chain and a second 100 MHz RF chain, and in some examples, the UE may transmit to a network access device a first indication of a supported RF bandwidth capability (e.g., 100 MHz per RF chain), and an RF component configuration including a number of power amplifiers of the UE, a maximum power parameter for at least one RF chain of the UE, and a PLL configuration of the number of RF chains. For example, the UE may report one power amplifier having a maximum power of Pmax, two power amplifiers having a maximum power of Pmax each, two power amplifiers having a maximum power of Pmax/2 each, or some other configuration of one or more power amplifiers. The UE may also report, for example, two "fixed" RF chains with no support for dynamic frequency re-tuning (e.g., 1 or 2 PLLs), one fixed RF chain and "flexible" RF chain that supports dynamic frequency re-tuning (e.g., 3 PLLs), two flexible RF chains (e.g., 4 PLLs), or some other PLL configuration. When the resource allocation is a DFT-S-OFDM waveform with multiple DFT clusters, and the UE reports one power amplifier having a maximum power of Pmax, the applied DFT size should match the total resource allocation size. When the resource allocation is a DFT-S-OFDM waveform with multiple DFT clusters, and the UE reports two power amplifiers having a maximum power of Pmax each, or two power amplifiers having a maximum power of Pmax/2 each, the applied DFT size should match the DFT cluster size. In some examples, the UE may also report, as part of its RF component configuration, a DFT size parameter of the UE.

In some examples, a UE may report different RF bandwidth capability information or RF component configuration information to a network access device, depending on whether the UE and network access device are communicating using a CP-OFDM waveform or a DFT-S-OFDM waveform. For example, it may not be necessary (though it is possible) to perform dynamic frequency re-tuning for a CP-OFDM waveform. However, the UE should indicate boundaries between adjacent bandwidth RF chains to the network access device. As another example, a wireless communication system may mandate that UEs that support a DFT-S-OFDM waveform have a dynamic frequency re-tuning capability to ensure proper operation. However, for mmW operation, the assignment bandwidth may be quite large, and the use of dynamic frequency re-tuning may depend on the assignment bandwidth (e.g., a UE may perform dynamic frequency re-tuning for small assignment bandwidths, but not large assignment bandwidths). The assignment bandwidths for which the UE will perform dynamic frequency re-tuning may be configured in advance, or may be indicated to the network access device as part of the UE's RF component configuration.

Figure 11:
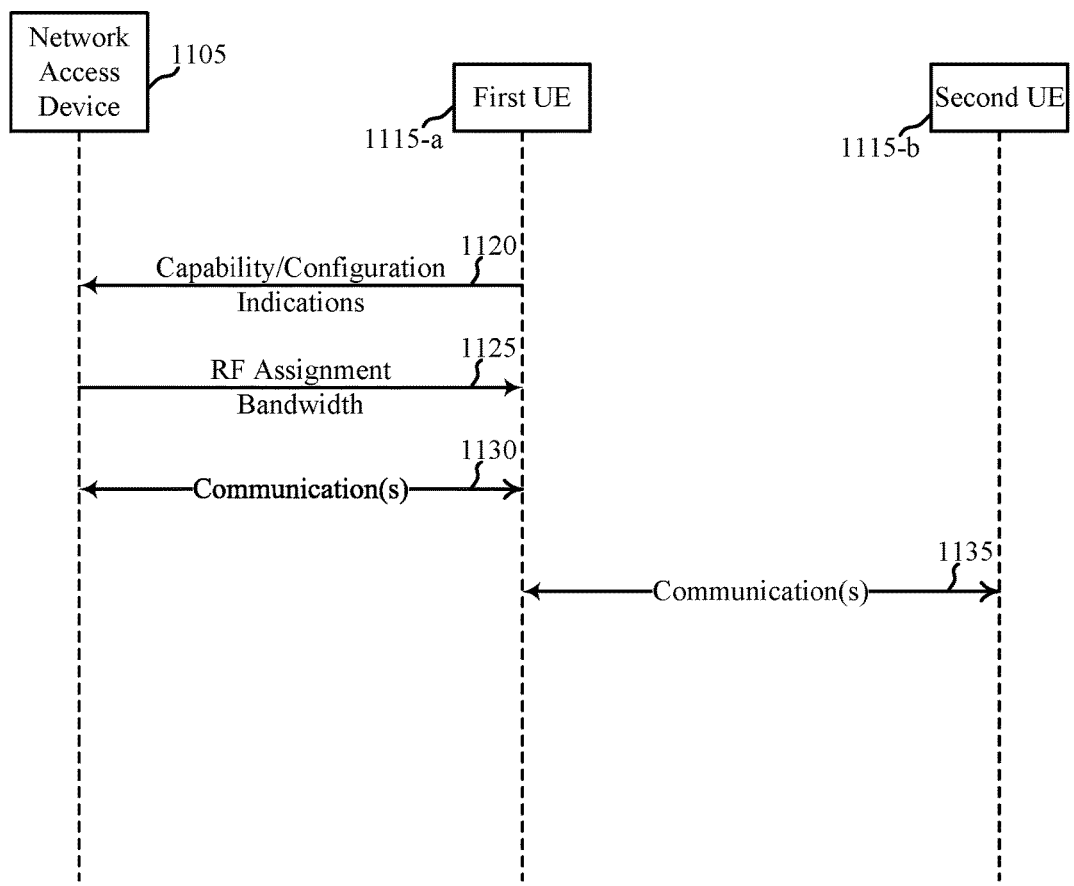
FIG. 11 shows a message flow between a network access device, a first UE, and a second UE, in accordance with various aspects of the present disclosure.

FIG. 11 shows a message flow 1100 between a network access device 1105, a first UE 1115-*a*, and a second UE 1115-*b*, in accordance with various aspects of the present disclosure. The network access device 1105, first UE 1115-*a*, and second UE 1115-*b* may be examples of aspects of the network access devices or UEs described with reference to FIGS. 1-4.

At 1120, the first UE 1115-*a* may transmit, to the network access device 1105, a first indication of a supported RF bandwidth capability of the first UE 1115-*a*, and a second indication of an RF component configuration of the first UE

1115-*a*. The RF component configuration may be associated with the RF bandwidth capability. In some examples, the first UE 1115-*a* may also transmit, at 1120, a third indication that the supported RF bandwidth capability or RF component configuration is associated with at least one of a link direction (e.g., downlink, uplink, or sidelink), a carrier frequency (e.g., sub-6 GHz or above-6 GHz (e.g., mmW)), or a combination thereof.

The RF component configuration of the first UE 1115-*a* may be associated with the supported RF bandwidth capability of the first UE 1115-*a*. In some examples, the RF component configuration of the first UE 1115-*a* may include a number of RF chains of the first UE 1115-*a*, a number of power amplifiers of the first UE 1115-*a*, a maximum power parameter for at least one RF chain of the first UE 1115-*a*, a PLL configuration of the number of RF chains, a DFT size parameter of the first UE 1115-*a*, a dynamic frequency re-tuning parameter of the first UE 1115-*a*, or a combination thereof. In some examples, the supported RF bandwidth capability of the first UE 1115-*a* may include an RF chain bandwidth configuration, an aggregate RF bandwidth of the first UE 1115-*a*, an indication of support for non-contiguous bandwidth within the aggregate RF bandwidth of the first UE 1115-*a*, at least one RF bandwidth boundary of the first UE 1115-*a*, or a combination thereof. In some examples, the supported RF bandwidth capability of the first UE 1115-*a* may include at least one RF boundary between a pair of RF chains of the first UE 1115-*a*. In some examples, the at least one RF boundary may be identified based at least in part on a system RF bandwidth, an RF bandwidth of the first UE 1115-*a*, or a dynamic frequency re-tuning capability of the first UE 1115-*a*.

At 1125, the network access device 1105 may optionally transmit, to the first UE 1115-*a*, a fourth indication of an RF assignment bandwidth for the first UE 1115-*a*.

At 1130, the first UE 1115-*a* may communicate with the network access device 1105 based at least in part on the supported RF bandwidth capability of the first UE 1115-*a* and the RF component configuration of the first UE 1115-*a*, and in some cases based at least in part on the RF assignment bandwidth for the first UE 1115-*a*. In some examples, the communication may include at least one of a downlink communication or an uplink communication based at least in part on at least one RF boundary of the first UE 1115-*a*.

At 1135, the first UE 1115-*a* may optionally communicate with the second UE 1115-*b* based at least in part on the supported RF bandwidth capability of the first UE 1115-*a* and the RF component configuration of the first UE 1115-*a*, and in some cases based at least in part on the RF assignment bandwidth for the first UE 1115-*a*. In some examples, the communication may include a sidelink communication based at least in part on at least one RF boundary of the first UE 1115-*a*.

In some examples, a wireless communication system may specify a finite set of values for Device RF BW (e.g., a set of values providing a 20 MHz, 50 MHz, 100 MHz, or 200 MHz granularity, etc.).

In some examples, it may be useful to ensure that an RF assignment bandwidth for some types of traffic does not cross an RF boundary between two RF chains of a UE. For example, for broadcast traffic such as a SIB or a paging message, it may be useful to ensure that an RF assignment bandwidth for receiving such traffic is within an RF chain bandwidth of the UE. Otherwise, the performance of the UE may degrade.

For channel estimation, it may be useful to ensure that an assignment bandwidth of a PRG used for coherent channel estimation does not cross an RF boundary between two RF chains of a UE (i.e., that the PRG is within an RF chain bandwidth of the UE). Otherwise, the UE may interpret the PRG indication as an error event (unless the UE can perform dynamic frequency re-tuning, which requires support of dynamic frequency re-tuning by the UE, and in some cases may require a small assignment bandwidth).

For CQI feedback (including CSI feedback), it may be useful to ensure that an assignment bandwidth of a subband for CQI/CSI feedback does not cross an RF boundary between two RF chains of a UE (i.e., that the subband is within an RF chain bandwidth of the UE). Otherwise, the UE may interpret the subband assignment as an error event (unless the UE can perform dynamic frequency re-tuning, which requires support of dynamic frequency re-tuning by the UE, and in some cases may require a small assignment bandwidth).

For an SRS transmission, it may be useful to ensure that an assignment bandwidth for the SRS transmission does not cross an RF boundary between two RF chains of a UE. Otherwise, the UE may interpret the assignment as an error event (unless the UE can perform dynamic frequency re-tuning, which requires support of dynamic frequency re-tuning by the UE, and in some cases may require a small assignment bandwidth). Alternatively, an assignment bandwidth for an SRS transmission may cross an RF boundary between two RF chains of a UE, and a network access device can account for any phase discontinuity in the SRS transmission. If an SRS transmission contains two or more subbands, each subband may be handled separately.

For positioning (based on a downlink reference symbol or an uplink reference symbol) or evolved Multimedia Broadcast Multicast Service (eMBMS), a wideband signal transmission may be necessary, and in some cases the wideband signal transmission may cross one or more RF boundaries between RF chains of a UE. In this case, phase discontinuities at RF boundaries may need to be accounted for at a receiving device, making knowledge of the RF boundaries of the transmitting device useful. For example, for a downlink reference signal, a network access device may indicate its RF boundaries (if any) to a UE, and the UE may account for phase discontinuities in the downlink reference signal based on the network access device's RF boundaries (if any) and the UE's RF boundaries (if any). The UE can estimate a phase offset between different RF segments and perform a coherent positioning operation accordingly. For an uplink reference signal, a UE may indicate its RF boundaries (if any) to a network access device, and the network access device may account for phase discontinuities in the uplink reference signal based on the UE's RF boundaries (if any) and the network access device's RF boundaries (if any). The network access device can estimate a phase offset between different RF segments and perform a coherent positioning operation accordingly.

Figure 12:
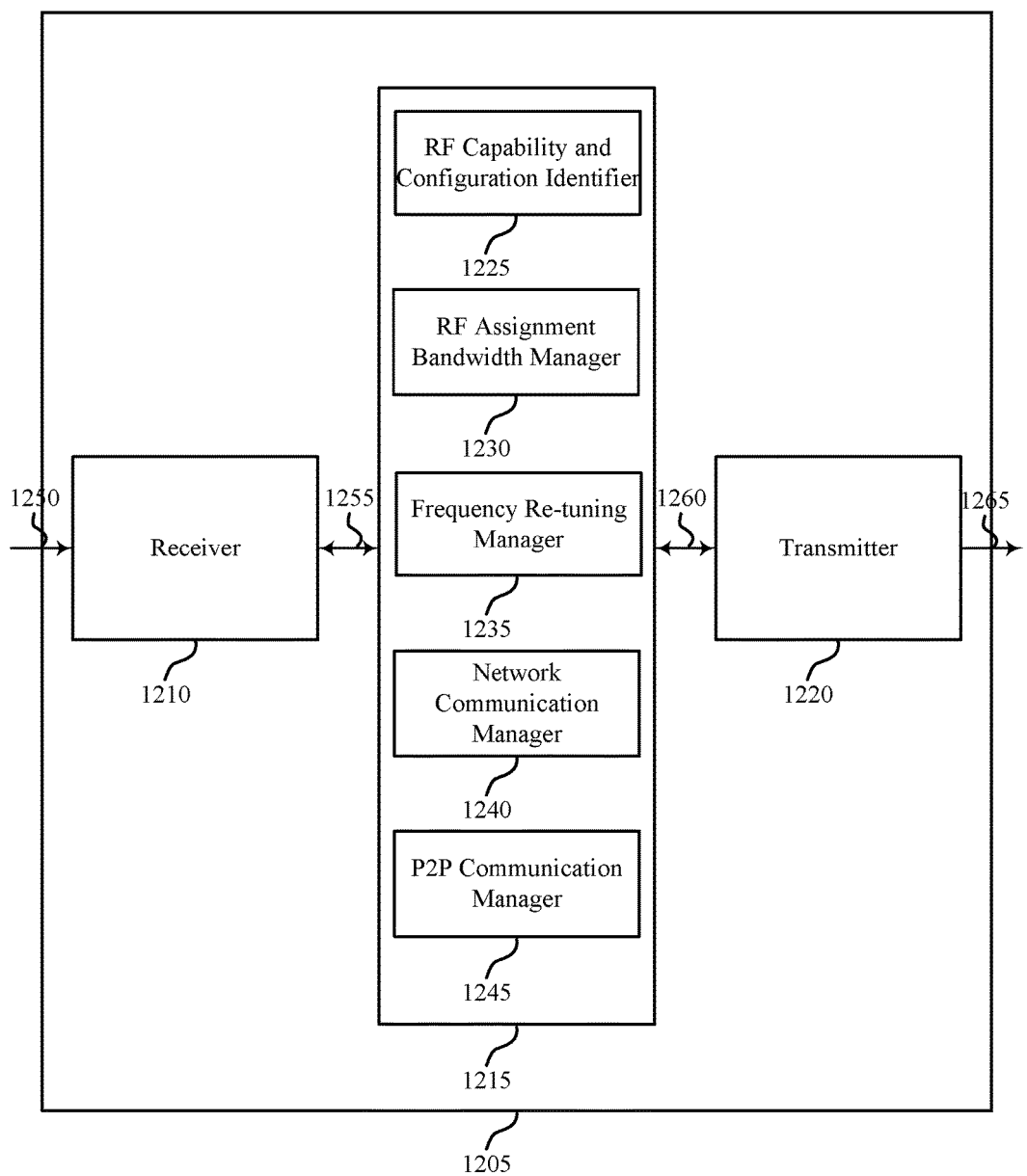
FIGS. 12 and 13 show block diagrams of apparatus for use in wireless communication, in accordance with various aspects of the present disclosure.

FIG. 12 shows a block diagram 1200 of an apparatus 1205 for use in wireless communication, in accordance with various aspects of the present disclosure. The apparatus 1205 may be an example of aspects of one or more of the UEs described with reference to FIGS. 1-4 and 11. The apparatus 1205 may include a receiver 1210, a wireless communication manager 1215, and a transmitter 1220. The apparatus 1205 may also include a processor. Each of these components may be in communication with one another (e.g., via one or more buses).

The receiver 1210 may receive data or control signals or information (i.e., transmissions 1250), some or all of which may be associated with various information channels (e.g., data channels, control channels, etc.). Received signals or information, or measurements performed thereon (e.g., signals or information 1255), may be passed to other components of the apparatus 1205. The receiver 1210 may include a single antenna or a set of antennas.

The wireless communication manager 1215 and/or at least some of its various sub-components may be implemented in hardware, software executed by a processor, firmware, or any combination thereof. If implemented in software executed by a processor, the functions of the wireless communication manager 1215 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The wireless communication manager 1215 and/or at least some of its various sub-components may be physically located at various positions, including being distributed such that portions of functions are implemented at different physical locations by one or more physical devices. In some examples, the wireless communication manager 1215 and/or at least some of its various sub-components may be a separate and distinct component in accordance with various aspects of the present disclosure. In other examples, the wireless communication manager 1215 and/or at least some of its various sub-components may be combined with one or more other hardware components, including but not limited to the receiver 1210, the transmitter 1220, a transceiver, another computing device, one or more other components described in the present disclosure, or a combination thereof, in accordance with various aspects of the present disclosure. The wireless communication manager 1215 may be an example of aspects of one or more of the wireless communication managers described with reference to FIG. 1. The wireless communication manager 1215 may include an RF capability and configuration identifier 1225, an optional RF assignment bandwidth manager 1230, an optional frequency re-tuning manager 1235, a network communication manager 1240, and an optional P2P communication manager 1245.

The RF capability and configuration identifier 1225 may be used to optionally identify a supported RF bandwidth capability of the apparatus 1205 and an RF component configuration of the apparatus 1205, as described for example with reference to FIGS. 4 and 11. The RF component configuration of the apparatus 1205 may be associated with the supported RF bandwidth capability of the apparatus 1205. In some examples, the RF component configuration of the apparatus 1205 may include a number of RF chains of the apparatus 1205, a number of power amplifiers of the apparatus 1205, a maximum power parameter for at least one RF chain of the apparatus 1205, a PLL configuration of the number of RF chains, a DFT size parameter of the apparatus 1205, a dynamic frequency re-tuning parameter of the apparatus 1205, or a combination thereof. In some examples, the supported RF bandwidth capability of the apparatus 1205 may include an RF chain bandwidth configuration, an aggregate RF bandwidth of the apparatus 1205, an indication of support for non-contiguous bandwidth within the aggregate RF bandwidth of the apparatus 1205, at least one RF bandwidth boundary of the apparatus 1205, or a combination thereof.

In some examples, identifying the supported RF bandwidth capability of the apparatus 1205 may include identifying at least one RF boundary between a pair of RF chains of the apparatus 1205. In some examples, the at least one RF boundary may be identified based at least in part on a system RF bandwidth, an RF bandwidth of the apparatus 1205, or a dynamic frequency re-tuning capability of the apparatus 1205.

The RF capability and configuration identifier 1225 may also be used to transmit, to a network access device, a first indication of the supported RF bandwidth capability of the apparatus 1205 and a second indication of the RF component configuration of the apparatus 1205, as described for example with reference to FIGS. 4 and 11. In some examples, the RF capability and configuration identifier 1225 may also be used to transmit a third indication that the supported RF bandwidth capability of the apparatus 1205 or the RF component configuration of the apparatus 1205 is associated with a link direction, a carrier frequency, or a combination thereof.

The RF assignment bandwidth manager 1230 may be used to optionally receive, from the network access device, a fourth indication of an RF assignment bandwidth for the apparatus 1205, as described for example with reference to FIGS. 5-11. The RF assignment bandwidth manager 1230 may also be used to optionally determine whether a signal or a channel associated with an RF assignment bandwidth overlaps an RF boundary of at least one RF boundary between a pair of RF chains of the apparatus 1205, as described for example with reference to FIGS. 5-11.

When the RF assignment bandwidth manager 1230 determines that a signal or a channel associated with an RF assignment bandwidth does not overlap an RF boundary between a pair of RF chains of the apparatus 1205, or when such a determination is not made, the network communication manager 1240 may be used to communicate with the network access device based at least in part on the supported RF bandwidth capability of the apparatus 1205 and the RF component configuration of the apparatus 1205, and in some cases based at least in part on the RF assignment bandwidth for the apparatus 1205, as described for example with reference to FIGS. 4 and 11. In some examples, the network communication manager 1240 may be used to perform at least one of a downlink communication or an uplink communication based at least in part on at least one RF boundary of the apparatus 1205.

Also or alternatively when the RF assignment bandwidth manager 1230 determines that a signal or a channel associated with an RF assignment bandwidth does not overlap an RF boundary between a pair of RF chains of the apparatus 1205, or when such a determination is not made, the P2P communication manager 1245 may be used to communicate with another UE based at least in part on the supported RF bandwidth capability of the apparatus 1205 and the RF component configuration of the apparatus 1205, and in some cases based at least in part on the RF assignment bandwidth for the apparatus 1205, as described for example with reference to FIGS. 4 and 11. In some examples, the P2P communication manager 1245 may be used to perform a sidelink communication based at least in part on at least one RF boundary of the apparatus 1205.

In some examples, the network communication manager 1240 or P2P communication manager 1245 may be used to optionally perform at least one DFT operation for a received communication, as described for example with reference to FIGS. 4 and 11.

When the RF assignment bandwidth manager 1230 determines that a signal or a channel associated with an RF assignment bandwidth overlaps an RF boundary between a pair of RF chains of the apparatus 1205, and when the apparatus 1205 supports dynamic frequency re-tuning, the frequency re-tuning manager 1235 may be used to perform a frequency re-tuning of at least one RF chain of the apparatus 1205 based at least in part on an RF assignment bandwidth, as described for example with reference to FIGS. 10-11. The apparatus may then communicate with the network access device or another UE using the re-tuned RF chain(s), and using the network communication manager 1240 or the P2P communication manager 1245.

When the RF assignment bandwidth manager 1230 determines that a signal or a channel associated with an RF assignment bandwidth overlaps an RF boundary between a pair of RF chains of the apparatus 1205, and when the apparatus 1205 does not support dynamic frequency re-tuning, the network communication manager 1240 may be used to refrain from communicating based on the signal or the channel, as described for example with reference to FIGS. 4 and 11.

In some examples, the first indication of the supported RF bandwidth capability may indicate an RF chain bandwidth of the apparatus 1205, and the RF assignment bandwidth manager 1230 may be used to receive, from the network access device, a fourth indication of an RF assignment bandwidth associated with a transmission of a SIB, a paging message, or an indication of a PRG used for channel estimation, with the RF assignment bandwidth being within the RF chain bandwidth. In these examples, the network communication manager 1240 may be used to receive the transmission using a single RF chain of the apparatus 1205.

In some examples, the first indication of the supported RF bandwidth capability may indicate an RF chain bandwidth of the apparatus 1205, and the RF assignment bandwidth manager 1230 may be used to receive, from the network access device, a fourth indication of an RF assignment bandwidth associated with a transmission of CQI feedback or an SRS, with the RF assignment bandwidth being within the RF chain bandwidth. In these examples, the network communication manager 1240 may be used to transmit the transmission using a single RF chain of the apparatus 1205.

In some examples, the network communication manager 1240 may be used to receive a transmission over a wideband CC using a set of RF chains configured to perform an intra-band contiguous carrier aggregation for different frequency ranges of the wideband CC.

In some examples, the first indication of the supported RF bandwidth capability may indicate an RF chain bandwidth of the apparatus 1205, and the RF assignment bandwidth manager 1230 may be used to receive, from the network access device, a fourth indication of an RF assignment bandwidth for the apparatus 1205. The RF assignment bandwidth for the apparatus 1205 may be less than the RF chain bandwidth of the apparatus 1205. In some examples, the RF assignment bandwidth may be associated with communication based at least in part on a carrier frequency, a waveform type, or a combination thereof. In some examples, the network communication manager 1240 may be used to communicate with the network access device or a UE based at least in part on the RF assignment bandwidth.

In some examples, the RF component configuration of the apparatus 1205 may include a first RF chain and a second RF chain associated with a single power amplifier, and no support for dynamic frequency re-tuning for the first RF chain and the second RF chain. In these examples, the RF assignment bandwidth manager 1230 may be used to receive a fourth indication of an RF assignment bandwidth for a DFT-S-OFDM waveform. The RF assignment bandwidth may span a first RF bandwidth of the first RF chain and a second RF bandwidth of the second RF chain. In these examples, the network communication manager 1240 or P2P communication manager 1245 may be used to perform separate DFT operations on first and second portions of the DFT-S-OFDM waveform received using the first RF chain and the second RF chain.

In some examples, the RF component configuration of the apparatus 1205 may include a first RF chain associated with a first power amplifier, a second RF chain associated with a second power amplifier, and no support for dynamic frequency re-tuning for the first RF chain and the second RF chain. In these examples, the RF assignment bandwidth manager 1230 may receive a fourth indication of an RF assignment bandwidth for a DFT-S-OFDM waveform. The RF assignment bandwidth may span a first RF bandwidth of the first RF chain and a second RF bandwidth of the second RF chain. In these examples, the network communication manager 1240 or P2P communication manager 1245 may be used to perform a single DFT operation on the DFT-S-OFDM waveform using the first RF chain and the second RF chain, and to perform separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

In some examples, the supported RF bandwidth capability of the apparatus 1205 may include an aggregate RF bandwidth of the apparatus 1205, and the RF component configuration of the apparatus 1205 may include a first RF chain associated with a first power amplifier, a second RF chain associated with a second power amplifier, support for dynamic frequency re-tuning for at least one of the first RF chain or the second RF chain, and no support for non-contiguous aggregate RF chain bandwidth. In these examples, the RF assignment bandwidth manager 1230 may be used to receive a fourth indication of a contiguous RF assignment bandwidth for a DFT-S-OFDM waveform. The contiguous RF assignment bandwidth may be associated with an RF bandwidth less than or equal to the aggregate RF bandwidth of the apparatus 1205, and the RF assignment bandwidth may span a first RF bandwidth of the first RF chain and a second RF bandwidth of the second RF chain. The network communication manager 1240 or P2P communication manager 1245 may be used to frequency re-tune at least one of the first RF bandwidth or the second RF bandwidth based at least in part on the RF assignment bandwidth; to perform, after the frequency re-tuning, a single DFT operation on the DFT-S-OFDM waveform using the first RF chain and the second RF chain; and to perform separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

In some examples, the supported RF bandwidth capability of the apparatus 1205 may include an aggregate RF bandwidth of the apparatus 1205, and the RF component configuration of the apparatus 1205 may include a first RF chain associated with a first power amplifier, a second RF chain associated with a second power amplifier, support for dynamic frequency re-tuning for at least one of the first RF chain or the second RF chain, and support for non-contiguous aggregate RF chain bandwidth. In these examples, the RF assignment bandwidth manager 1230 may be used to receive a fourth indication of a non-contiguous RF assignment bandwidth for a DFT-S-OFDM waveform. The non-contiguous RF assignment bandwidth may be associated with an RF bandwidth less than or equal to the aggregate RF bandwidth of the apparatus 1205, and the RF assignment bandwidth may span a first RF bandwidth of the first RF chain and a second RF bandwidth of the second RF chain. The frequency re-tuning manager 1235 may be used to frequency re-tune at least one of the first RF bandwidth or the second RF bandwidth based at least in part on the RF assignment bandwidth. The network communication manager 1240 or P2P communication manager 1245 may be used to perform, after the frequency re-tuning, a single DFT operation on the DFT-S-OFDM waveform using the first RF chain and the second RF chain. The network communication manager 1240 or P2P communication manager 1245 may also be used to perform separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

The transmitter 1220 may receive and transmit data or control signals or information (i.e., transmissions 1260, 1265) generated by other components of the apparatus 1205, some or all of which may be associated with various information channels (e.g., data channels, control channels, etc.). In some examples, the transmitter 1220 may be collocated with the receiver 1210 in a transceiver. For example, the transmitter 1220 and receiver 1210 may be an example of aspects of the transceiver 1430 described with reference to FIG. 14. The transmitter 1220 may include a single antenna or a set of antennas.

Figure 13:
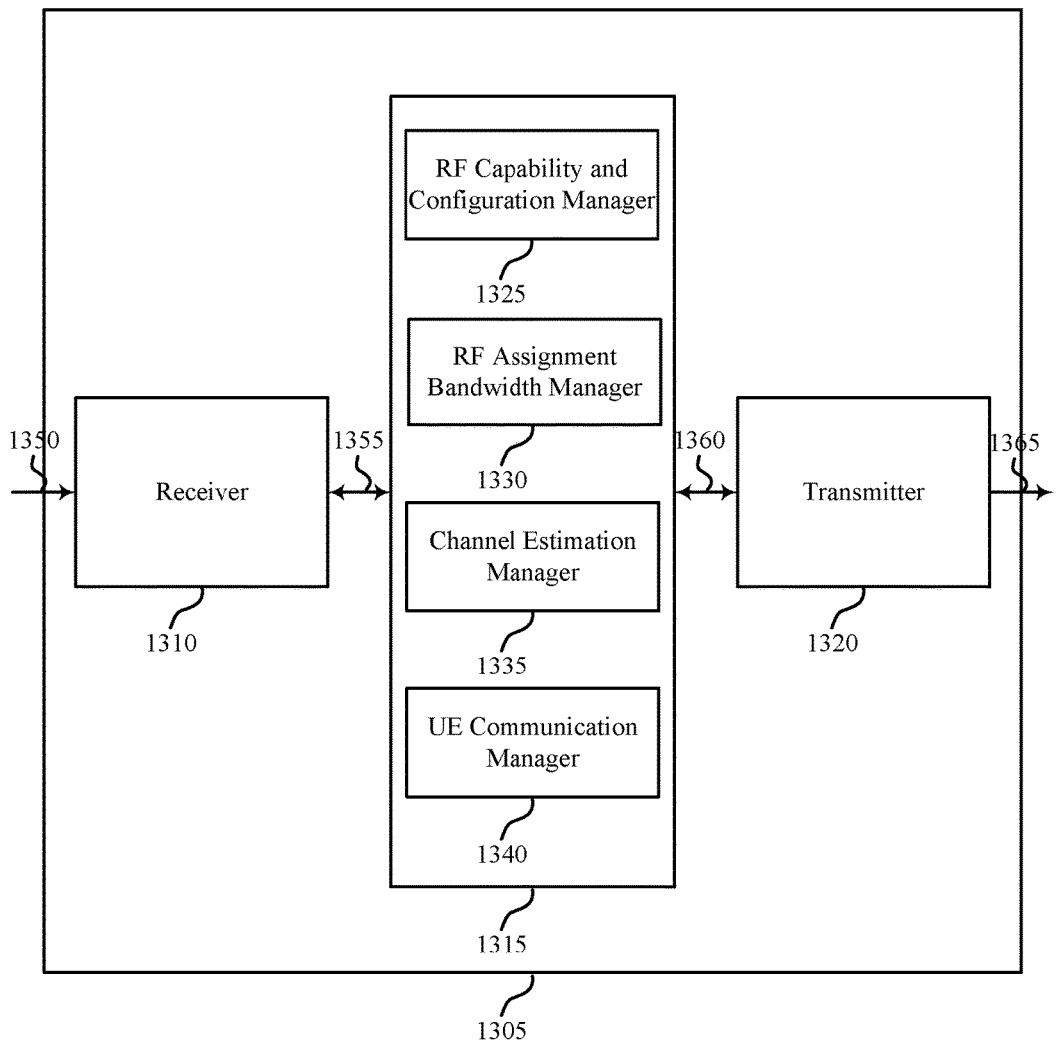

FIG. 13 shows a block diagram 1300 of an apparatus 1305 for use in wireless communication, in accordance with various aspects of the present disclosure. The apparatus 1305 may be an example of aspects of one or more of the network access devices described with reference to FIGS. 1-4 and 11. The apparatus 1305 may include a receiver 1310, a wireless communication manager 1315, and a transmitter 1320. The apparatus 1305 may also include a processor. Each of these components may be in communication with one another (e.g., via one or more buses).

The receiver 1310 may receive data or control signals or information (i.e., transmissions 1350), some or all of which may be associated with various information channels (e.g., data channels, control channels, etc.). Received signals or information, or measurements performed thereon (e.g., signals or information 1355), may be passed to other components of the apparatus 1305. The receiver 1310 may include a single antenna or a set of antennas.

The wireless communication manager 1315 and/or at least some of its various sub-components may be implemented in hardware, software executed by a processor, firmware, or any combination thereof. If implemented in software executed by a processor, the functions of the wireless communication manager 1315 and/or at least some of its various sub-components may be executed by a general-purpose processor, a DSP, an ASIC, a FPGA or other programmable logic device, discrete gate or transistor logic, discrete hardware components, or any combination thereof designed to perform the functions described in the present disclosure.

The wireless communication manager 1315 and/or at least some of its various sub-components may be physically located at various positions, including being distributed such that portions of functions are implemented at different physical locations by one or more physical devices. In some examples, the wireless communication manager 1315 and/or at least some of its various sub-components may be a separate and distinct component in accordance with various aspects of the present disclosure. In other examples, the wireless communication manager 1315 and/or at least some of its various sub-components may be combined with one or more other hardware components, including but not limited to the receiver 1310, the transmitter 1320, a transceiver, another computing device, one or more other components described in the present disclosure, or a combination thereof, in accordance with various aspects of the present disclosure. The wireless communication manager 1315 may be an example of aspects of one or more of the wireless communication managers described with reference to FIG. 1. The wireless communication manager 1315 may include an RF capability and configuration manager 1325, an optional RF assignment bandwidth manager 1330, an optional channel estimation manager 1335, and a UE communication manager 1340.

The RF capability and configuration manager 1325 may be used to receive, from a UE, a first indication of a supported RF bandwidth capability of the UE and a second indication of an RF component configuration of the UE, as described for example with reference to FIGS. 4 and 11. The RF component configuration of the UE may be associated with the supported RF bandwidth capability of the UE. In some examples, the RF component configuration of the UE may include a number of RF chains of the UE, a number of power amplifiers of the UE, a maximum power parameter for at least one RF chain of the UE, a PLL configuration of the number of RF chains, a DFT size parameter of the UE, a dynamic frequency re-tuning parameter of the UE, or a combination thereof. In some examples, the supported RF bandwidth capability of the UE may include an RF chain bandwidth configuration, an aggregate RF bandwidth of the UE, an indication of support for non-contiguous bandwidth within the aggregate RF bandwidth of the UE, at least one RF bandwidth boundary of the UE, or a combination thereof. In some examples, the RF capability and configuration manager 1324 may receive a third indication that the supported RF bandwidth capability of the UE or the RF component configuration of the UE is associated with a link direction, a carrier frequency, or a combination thereof.

In some examples, the RF capability and configuration manager 1325 may be used to identify, from at least one of the first indication of the supported RF bandwidth capability of the UE or the second indication of the RF component configuration of the UE, at least one RF boundary between a pair of RF chains of the UE, as described for example with reference to FIG. 11. In some examples, the at least one RF boundary may be identified based at least in part on a system RF bandwidth, an RF bandwidth of the UE, or a dynamic frequency re-tuning capability of the UE.

The RF assignment bandwidth manager 1330 may be used to optionally transmit, to the UE, a fourth indication of an RF assignment bandwidth for the UE, as described for example with reference to FIGS. 5-11.

When the first indication of the supported RF bandwidth capability of the UE indicates at least one uplink RF chain bandwidth boundary of the UE, the channel estimation manager 1335 may be used to optionally determine a channel estimation average to be within an RF bandwidth of the UE defined by the at least one uplink RF chain bandwidth boundary of the UE, as described for example with reference to FIGS. 5-11.

The UE communication manager 1340 may be used to communicate with the UE based at least in part on the supported RF bandwidth capability of the UE and the RF component configuration of the UE, and in some cases based at least in part on the RF assignment bandwidth for the UE, as described for example with reference to FIGS. 4 and 11.

When the first indication of the supported RF bandwidth capability of the UE indicates at least one uplink RF chain bandwidth boundary of the UE, the UE communication manager 1340 may be used to optionally set a DFT-S-OFDM waveform cluster boundary to be within an RF bandwidth of the UE defined by the at least one uplink RF chain bandwidth boundary of the UE, as described for example with reference to FIGS. 5-11.

In some examples, the first indication of the supported RF bandwidth capability may indicate an RF chain bandwidth of the UE. In these examples, the RF assignment bandwidth manager 1330 or UE communication manager 1340 may be used to transmit, to the UE, a fourth indication of an RF assignment bandwidth associated with a transmission of a SIB, a paging message, or an indication of a PRG used for channel estimation. The RF assignment bandwidth may be within the RF chain bandwidth.

In some examples, the first indication of the supported RF bandwidth capability may indicate an RF chain bandwidth of the UE. In these examples, the RF assignment bandwidth manager 1330 or UE communication manager 1340 may be used to transmit, to the UE, a fourth indication of an RF assignment bandwidth associated with a transmission of CQI feedback or an SRS. The RF assignment bandwidth may be within the RF chain bandwidth.

In some examples, the first indication of the supported RF bandwidth capability may indicate an RF chain bandwidth of the UE. In these examples, the RF assignment bandwidth manager 1330 or UE communication manager 1340 may be used to transmit, to the UE, a fourth indication of an RF assignment bandwidth for the UE. The RF assignment bandwidth for the UE may be less than the RF chain bandwidth of the UE. In some examples, the RF assignment bandwidth may be associated with communication based at least in part on a carrier frequency, a waveform type, or a combination thereof. In some examples, the UE communication manager 1340 may be used to communicate with the UE based at least in part on the RF assignment bandwidth.

In some examples, the UE communication manager 1340 may be used to perform at least one of a downlink communication or an uplink communication with the UE, or to schedule a sidelink communication for the UE, based at least in part on at least one RF boundary identified by the RF capability and configuration manager 1325.

In some examples, the UE communication manager 1340 may be used to refrain from scheduling or transmitting a signal or a channel with an RF assignment bandwidth that overlaps an RF boundary of the at least one RF boundary.

The transmitter 1320 may transmit data or control signals or information (i.e., transmissions 1360, 1365) generated by other components of the apparatus 1305, some or all of which may be associated with various information channels (e.g., data channels, control channels, etc.). In some examples, the transmitter 1320 may be collocated with the receiver 1310 in a transceiver. For example, the transmitter 1320 and receiver 1310 may be an example of aspects of the transceiver 1550 described with reference to FIG. 15. The transmitter 1320 may include a single antenna or a set of antennas.

Figure 14:
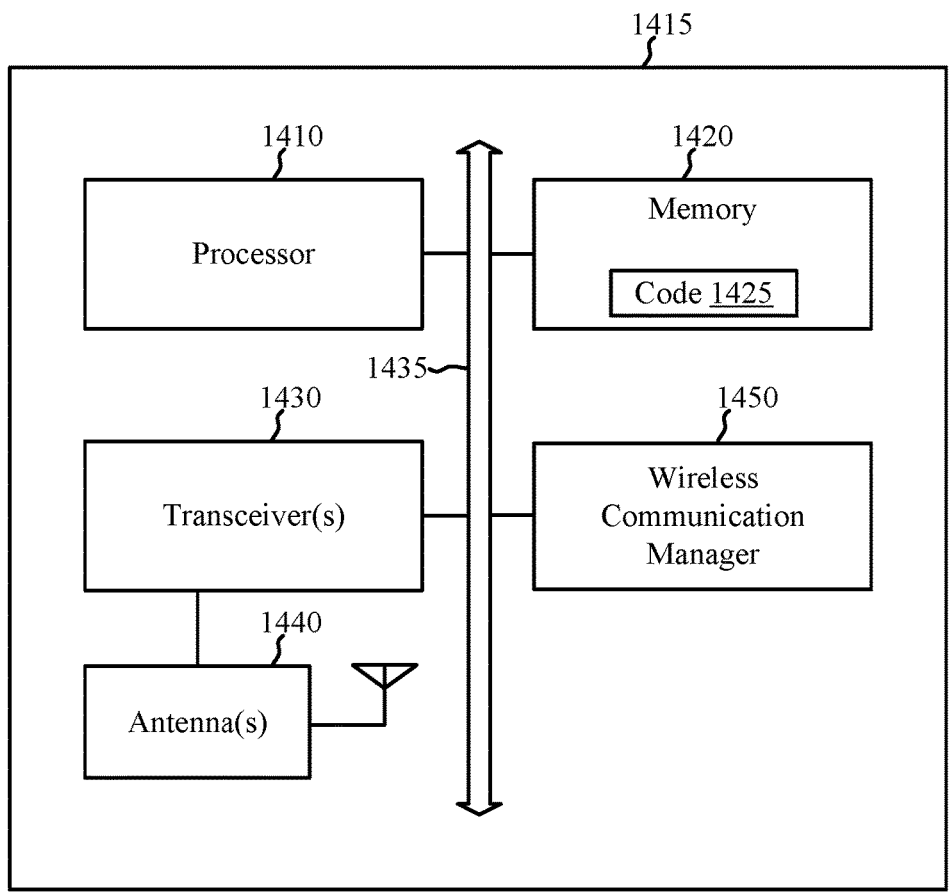
FIG. 14 shows a block diagram of a UE for use in wireless communication, in accordance with various aspects of the present disclosure.

FIG. 14 shows a block diagram 1400 of a UE 1415 for use in wireless communication, in accordance with various aspects of the present disclosure. The UE 1415 may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 1415 may, in some examples, have an internal power supply (not shown), such as a small battery, to facilitate mobile operation. In some examples, the UE 1415 may be an example of aspects of one or more of the UEs described with reference to FIGS. 1-4 and 11, or aspects of the apparatus described with reference to FIG. 12. The UE 1415 may be configured to implement at least some of the UE or apparatus techniques or functions described with reference to FIGS. 1-12.

The UE 1415 may include a processor 1410, a memory 1420, at least one transceiver (represented by transceiver(s) 1430), antennas 1440 (e.g., an antenna array), or a wireless communication manager 1450. Each of these components may be in communication with each other, directly or indirectly, over one or more buses 1435.

The memory 1420 may include random access memory (RAM) or read-only memory (ROM). The memory 1420 may store computer-readable, computer-executable code 1425 containing instructions that are configured to, when executed, cause the processor 1410 to perform various functions described herein related to wireless communication, including, for example, transmitting indications of a supported RF bandwidth capability and RF component configuration of the UE 1415, and communicating with a network access device based on the supported RF bandwidth capability and RF component configuration. Alternatively, the computer-executable code 1425 may not be directly executable by the processor 1410 but be configured to cause the UE 1415 (e.g., when compiled and executed) to perform various of the functions described herein.

The processor 1410 may include an intelligent hardware device, e.g., a central processing unit (CPU), a microcontroller, an ASIC, etc. The processor 1410 may process information received through the transceiver(s) 1430 or information to be sent to the transceiver(s) 1430 for transmission through the antennas 1440. The processor 1410 may handle, alone or in connection with the wireless communication manager 1450, one or more aspects of communicating over (or managing communications over) one or more radio frequency spectrum bands.

The transceiver(s) 1430 may include a modem configured to modulate packets and provide the modulated packets to the antennas 1440 for transmission, and to demodulate packets received from the antennas 1440. The transceiver(s) 1430 may, in some examples, be implemented as one or more transmitters and one or more separate receivers. The transceiver(s) 1430 may support communications in one or more radio frequency spectrum bands. The transceiver(s) 1430 may be configured to communicate bi-directionally, via the antennas 1440, with one or more network access devices or apparatuses, such as one or more of the network access devices or apparatus described with reference to FIGS. 1-4, 11, and 13.

The wireless communication manager 1450 may be configured to perform or control some or all of the UE or apparatus techniques or functions described with reference to FIGS. 1-12 related to wireless communication. The wireless communication manager 1450, or portions of it, may include a processor, or some or all of the functions of the wireless communication manager 1450 may be performed by the processor 1410 or in connection with the processor 1410. In some examples, the wireless communication manager 1450 may be an example of aspects of one or more of the wireless communication managers described with reference to FIGS. 1 and 12.

Figure 15:
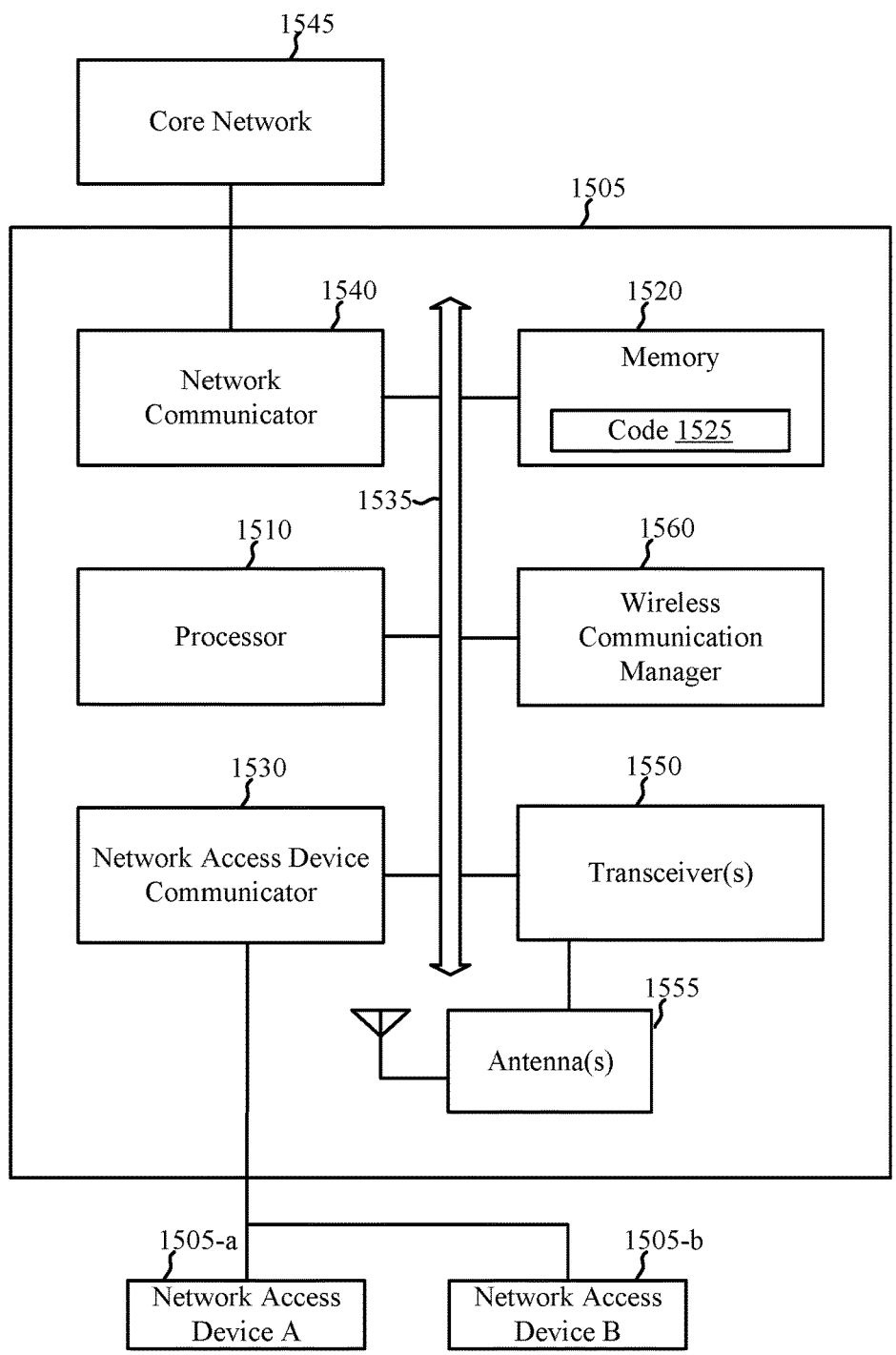
FIG. 15 shows a block diagram of a network access device for use in wireless communication, in accordance with various aspects of the present disclosure.

FIG. 15 shows a block diagram 1500 of a network access device 1505 for use in wireless communication, in accordance with various aspects of the present disclosure. In some examples, the network access device 1505 may be an example of aspects of one or more of the network access devices described with reference to FIGS. 1-4 and 11, or aspects of the apparatus described with reference to FIG. 13. The network access device 1505 may be configured to implement or facilitate at least some of the network access device or apparatus techniques or functions described with reference to FIGS. 1-11 and 13.

The network access device 1505 may include a processor 1510, a memory 1520, at least one transceiver (represented by transceiver(s) 1550), at least one antenna 1555 (e.g., an antenna array), or a wireless communication manager 1560. The network access device 1505 may also include one or more of a network access device communicator 1530 or a network communicator 1540. Each of these components may be in communication with each other, directly or indirectly, over one or more buses 1535.

The memory 1520 may include RAM or ROM. The memory 1520 may store computer-readable, computer-executable code 1525 containing instructions that are configured to, when executed, cause the processor 1510 to perform various functions described herein related to wireless communication, including, for example, receiving indications of a supported RF bandwidth capability and RF component configuration of a UE, and communicating with the UE based on the supported RF bandwidth capability and RF component configuration. Alternatively, the computer-executable code 1525 may not be directly executable by the processor 1510 but be configured to cause the network access device 1505 (e.g., when compiled and executed) to perform various of the functions described herein.

The processor 1510 may include an intelligent hardware device, e.g., a CPU, a microcontroller, an ASIC, etc. The processor 1510 may process information received through the transceiver(s) 1550, the network access device communicator 1530, or the network communicator 1540. The processor 1510 may also process information to be sent to the transceiver(s) 1550 for transmission through the antennas 1555, or to the network access device communicator 1530 for transmission to one or more other network access devices (e.g., network access device 1505-*a* and network access device 1505-*b*), or to the network communicator 1540 for transmission to a core network 1545, which may be an example of aspects of the core network 130 described with reference to FIG. 1. The processor 1510 may handle, alone or in connection with the wireless communication manager 1560, one or more aspects of communicating over (or managing communications over) one or more radio frequency spectrum bands.

The transceiver(s) 1550 may include a modem configured to modulate packets and provide the modulated packets to the antennas 1555 for transmission, and to demodulate packets received from the antennas 1555. The transceiver(s) 1550 may, in some examples, be implemented as one or more transmitters and one or more separate receivers. The transceiver(s) 1550 may support communications in one or more radio frequency spectrum bands. The transceiver(s) 1550 may be configured to communicate bi-directionally, via the antennas 1555, with one or more UEs or apparatuses, such as one or more of the UEs or apparatus described with reference to FIGS. 1-4, 11, 12, and 14. The network access device 1505 may communicate with the core network 1545 through the network communicator 1540. The network access device 1505 may also communicate with other network access devices, such as the network access device 1505-*a* and the network access device 1505-*b*, using the network access device communicator 1530.

The wireless communication manager 1560 may be configured to perform or control some or all of the network access device or apparatus techniques or functions described with reference to FIGS. 1-11 and 13 related to wireless communication. The wireless communication manager 1560, or portions of it, may include a processor, or some or all of the functions of the wireless communication manager 1560 may be performed by the processor 1510 or in connection with the processor 1510. In some examples, the wireless communication manager 1560 may be an example of aspects of one or more of the wireless communication managers described with reference to FIGS. 1 and 13.

Figure 16:
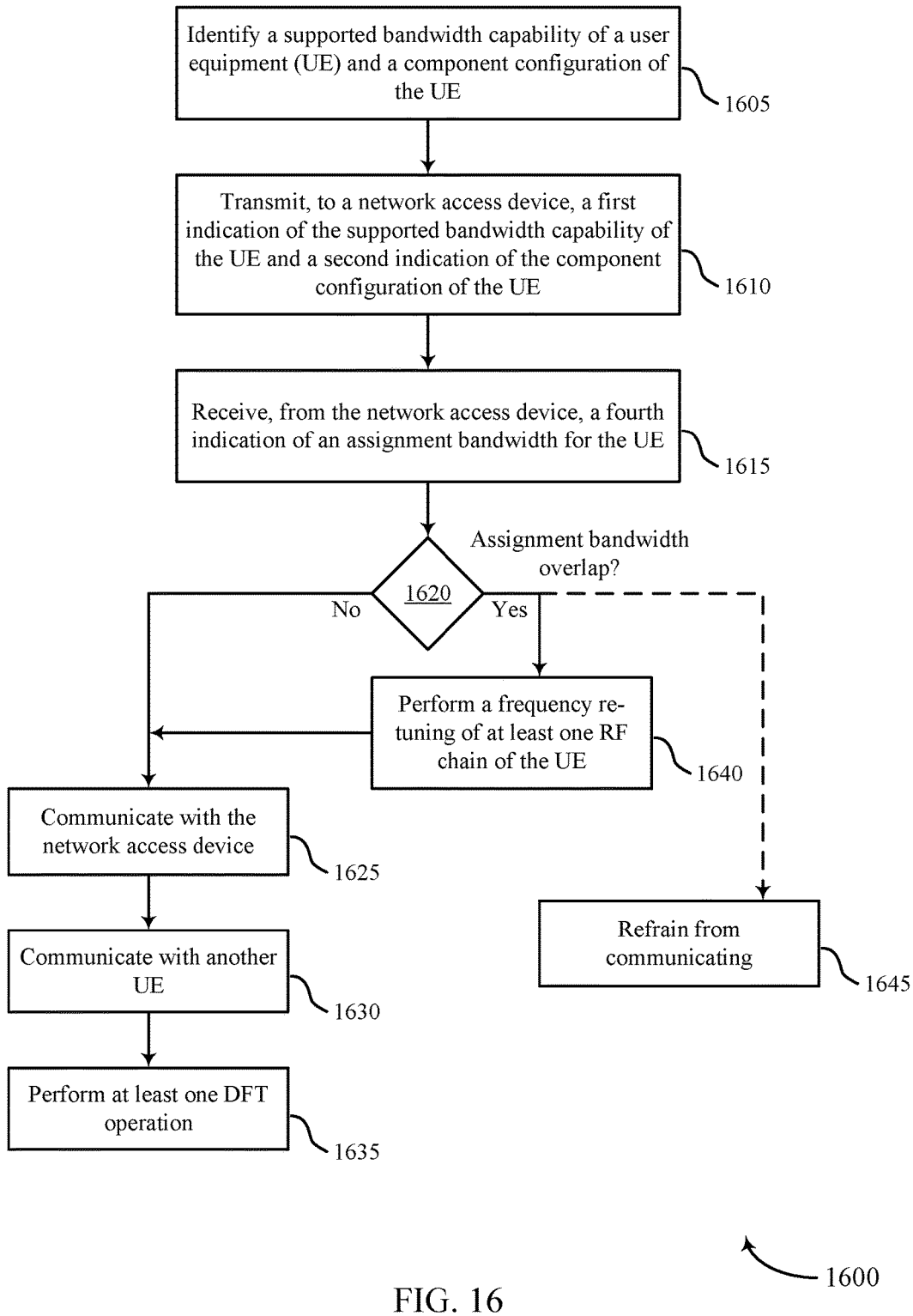
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs described with reference to FIGS. 1-4, 11, and 14, aspects of the apparatus described with reference to FIG. 12, or aspects of one or more of the wireless communication managers described with reference to FIGS. 1, 12, and 14. In some examples, a UE may execute one or more sets of codes to control the functional elements of the UE to perform the functions described below. Additionally or alternatively, the UE may perform one or more of the functions described below using special-purpose hardware.

At block 1605, the method 1600 may optionally include identifying a supported RF bandwidth capability of the UE and an RF component configuration of the UE, as described for example with reference to FIGS. 4 and 11. The RF component configuration of the UE may be associated with the supported RF bandwidth capability of the UE. In some examples, the RF component configuration of the UE may include a number of RF chains of the UE, a number of power amplifiers of the UE, a maximum power parameter for at least one RF chain of the UE, a PLL configuration of the number of RF chains, a DFT size parameter of the UE, a dynamic frequency re-tuning parameter of the UE, or a combination thereof. In some examples, the supported RF bandwidth capability of the UE may include an RF chain bandwidth configuration, an aggregate RF bandwidth of the UE, an indication of support for non-contiguous bandwidth within the aggregate RF bandwidth of the UE, at least one RF bandwidth boundary of the UE, or a combination thereof. In some examples, identifying the supported RF bandwidth capability of the UE may include identifying at least one RF boundary between a pair of RF chains of the UE. In some examples, the at least one RF boundary may be identified based at least in part on a system RF bandwidth, an RF bandwidth of the UE, or a dynamic frequency re-tuning capability of the UE. In some examples, the operation(s) at block 1605 may be performed using the RF capability and configuration identifier described with reference to FIG. 12.

At block 1610, the method 1600 may include transmitting, to a network access device, a first indication of the supported RF bandwidth capability of the UE and a second indication of the RF component configuration of the UE, as described for example with reference to FIGS. 4 and 11. In some examples, the operation(s) at block 1610 may include transmitting a third indication that the supported RF bandwidth capability of the UE or the RF component configuration of the UE is associated with a link direction, a carrier frequency, or a combination thereof. In some examples, the operation(s) at block 1610 may be performed using the RF capability and configuration identifier described with reference to FIG. 12.

At block 1615, the method 1600 may optionally include receiving, from the network access device, a fourth indication of an RF assignment bandwidth for the UE, as described for example with reference to FIGS. 5-11. In some examples, the operation(s) at block 1615 may be performed using the RF assignment bandwidth manager described with reference to FIG. 12.

At block 1620, the method 1600 may optionally include determining whether a signal or a channel associated with an RF assignment bandwidth overlaps an RF boundary of at least one RF boundary between a pair of RF chains of the UE, as described for example with reference to FIGS. 5-11. The method 1600 may continue at block 1625 upon determining the signal or the channel does not overlap an RF boundary between a pair of RF chains of the UE, or when the operation(s) at block 1620 are not performed. The method 1600 may continue at block 1640 upon determining the signal or the channel overlaps an RF boundary between a pair of RF chains of the UE, and when the UE supports dynamic frequency re-tuning. The method 1600 may continue at block 1645 upon determining the signal or the channel overlaps an RF boundary between a pair of RF chains of the UE, and when the UE does not support dynamic frequency re-tuning. In some examples, the operation(s) at block 1620 may be performed using the RF assignment bandwidth manager described with reference to FIG. 12.

At block 1625, the method 1600 may include communicating with the network access device based at least in part on the supported RF bandwidth capability of the UE and the RF component configuration of the UE, and in some cases based at least in part on the RF assignment bandwidth for the UE, as described for example with reference to FIGS. 4 and 11. In some examples, the operation(s) at block 1625 may include performing at least one of a downlink communication or an uplink communication based at least in part on at least one RF boundary of the UE. In some examples, the operation(s) at block 1625 may be performed using the network communication manager described with reference to FIG. 12.

At block 1630, the method 1600 may optionally include communicating with another UE based at least in part on the supported RF bandwidth capability of the UE and the RF component configuration of the UE, and in some cases based at least in part on the RF assignment bandwidth for the UE, as described for example with reference to FIGS. 4 and 11. In some examples, the operation(s) at block 1630 may include performing a sidelink communication based at least in part on at least one RF boundary of the UE. In some examples, the operation(s) at block 1630 may be performed using the P2P communication manager described with reference to FIG. 12.

At block 1635, the method 1600 may optionally include performing at least one DFT operation for a communication received at block 1630 or 1635, as described for example with reference to FIGS. 4 and 11. In some examples, the operation(s) at block 1635 may be performed using the network communication manager or P2P communication manager described with reference to FIG. 12.

At block 1640, the method 1600 may include performing a frequency re-tuning of at least one RF chain of the UE based at least in part on an RF assignment bandwidth, as described for example with reference to FIGS. 10-11. The method 1600 may continue at block 1625 following the frequency re-tuning. In some examples, the operation(s) at block 1640 may be performed using the frequency re-tuning manager described with reference to FIG. 12.

At block 1645, the method 1600 may include refraining from communicating based on the signal or the channel, as described for example with reference to FIGS. 4 and 11. In some examples, the operation(s) at block 1645 may be performed using the network communication manager described with reference to FIG. 12.

In some examples of the method 1600, the first indication of the supported RF bandwidth capability may indicate an RF chain bandwidth of the UE, and the method may further include receiving, from the network access device and at block 1615, a fourth indication of an RF assignment bandwidth associated with a transmission of a SIB, a paging message, or an indication of a PRG used for channel estimation, with the RF assignment bandwidth being within the RF chain bandwidth. In these examples, the method 1600 may also include receiving the transmission, at block 1625, using a single RF chain of the UE.

In some examples of the method 1600, the first indication of the supported RF bandwidth capability may indicate an RF chain bandwidth of the UE, and the method may further include receiving, from the network access device and at block 1615, a fourth indication of an RF assignment bandwidth associated with a transmission of CQI feedback or an SRS, with the RF assignment bandwidth being within the RF chain bandwidth. In these examples, the method 1600 may also include transmitting the transmission, at block 1625, using a single RF chain of the UE.

In some examples, the operation(s) at block 1625 may include receiving a transmission over a wideband CC using a set of RF chains configured to perform an intra-band contiguous carrier aggregation for different frequency ranges of the wideband CC.

In some examples of the method 1600, the first indication of the supported RF bandwidth capability may indicate an RF chain bandwidth of the UE, and the method 1600 may further include receiving, from the network access device at block 1615, a fourth indication of an RF assignment bandwidth for the UE. The RF assignment bandwidth for the UE may be less than the RF chain bandwidth of the UE. In some examples, the RF assignment bandwidth may be associated with communication based at least in part on a carrier frequency, a waveform type, or a combination thereof. In some examples, the UE may communicate with the network access device or another UE, at block 1625 or 1630, based at least in part on the RF assignment bandwidth.

In some examples of the method 1600, the RF component configuration identified at block 1605 and indicated at block 1610 may include a first RF chain and a second RF chain associated with a single power amplifier, and no support for dynamic frequency re-tuning for the first RF chain and the second RF chain. In these examples, the method 1600 may further include receiving, at block 1615, a fourth indication of an RF assignment bandwidth for a DFT-S-OFDM waveform. The RF assignment bandwidth may span a first RF bandwidth of the first RF chain and a second RF bandwidth of the second RF chain. The method 1600 may further include performing separate DFT operations on first and second portions of the DFT-S-OFDM waveform received using the first RF chain and the second RF chain (e.g., at block 1625 or 1630).

In some examples of the method 1600, the RF component configuration identified at block 1605 and indicated at block 1610 may include a first RF chain associated with a first power amplifier, a second RF chain associated with a second power amplifier, and no support for dynamic frequency re-tuning for the first RF chain and the second RF chain. In these examples, the method 1600 may further include receiving, at block 1615, a fourth indication of an RF assignment bandwidth for a DFT-S-OFDM waveform. The RF assignment bandwidth may span a first RF bandwidth of the first RF chain and a second RF bandwidth of the second RF chain. The method 1600 may further include performing a single DFT operation on the DFT-S-OFDM waveform using the first RF chain and the second RF chain, and performing separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

In some examples of the method 1600, the supported RF bandwidth capability identified at block 1605 and indicated at block 1610 may include an aggregate RF bandwidth of the UE, and the RF component configuration identified at block 1605 and indicated at block 1610 may include a first RF chain associated with a first power amplifier, a second RF chain associated with a second power amplifier, support for dynamic frequency re-tuning for at least one of the first RF chain or the second RF chain, and no support for non-contiguous aggregate RF chain bandwidth. In these examples, the method 1600 may further include receiving, at block 1615, a fourth indication of a contiguous RF assignment bandwidth for a DFT-S-OFDM waveform. The contiguous RF assignment bandwidth may be associated with an RF bandwidth less than or equal to the aggregate RF bandwidth of the UE, and the RF assignment bandwidth may span a first RF bandwidth of the first RF chain and a second RF bandwidth of the second RF chain. The method 1600 may further include frequency re-tuning at least one of the first RF bandwidth or the second RF bandwidth based at least in part on the RF assignment bandwidth; performing, after the frequency re-tuning, a single DFT operation on the DFT-S-OFDM waveform using the first RF chain and the second RF chain; and performing separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

In some examples of the method 1600, the supported RF bandwidth capability identified at block 1605 and indicated at block 1610 may include an aggregate RF bandwidth of the UE, and the RF component configuration identified at block 1605 and indicated at block 1610 may include a first RF chain associated with a first power amplifier, a second RF chain associated with a second power amplifier, support for dynamic frequency re-tuning for at least one of the first RF chain or the second RF chain, and support for non-contiguous aggregate RF chain bandwidth. In these examples, the method 1600 may further include receiving, at block 1615, a fourth indication of a non-contiguous RF assignment bandwidth for a DFT-S-OFDM waveform. The non-contiguous RF assignment bandwidth may be associated with an RF bandwidth less than or equal to the aggregate RF bandwidth of the UE, and the RF assignment bandwidth may span a first RF bandwidth of the first RF chain and a second RF bandwidth of the second RF chain. The method 1600 may further include frequency re-tuning at least one of the first RF bandwidth or the second RF bandwidth based at least in part on the RF assignment bandwidth; performing, after the frequency re-tuning, a single DFT operation on the DFT-S-OFDM waveform using the first RF chain and the second RF chain; and performing separate DFT cluster operations on the DFT-S-OFDM waveform using the first RF chain and the second RF chain; and performing separate DFT cluster operations on the DFT-S-OFDM waveform using the first RF chain and the second RF chain. A first DFT cluster associated with the first RF chain and a second DFT cluster associated with the second RF chain may be contiguous in phase and resource allocation.

Figure 17:
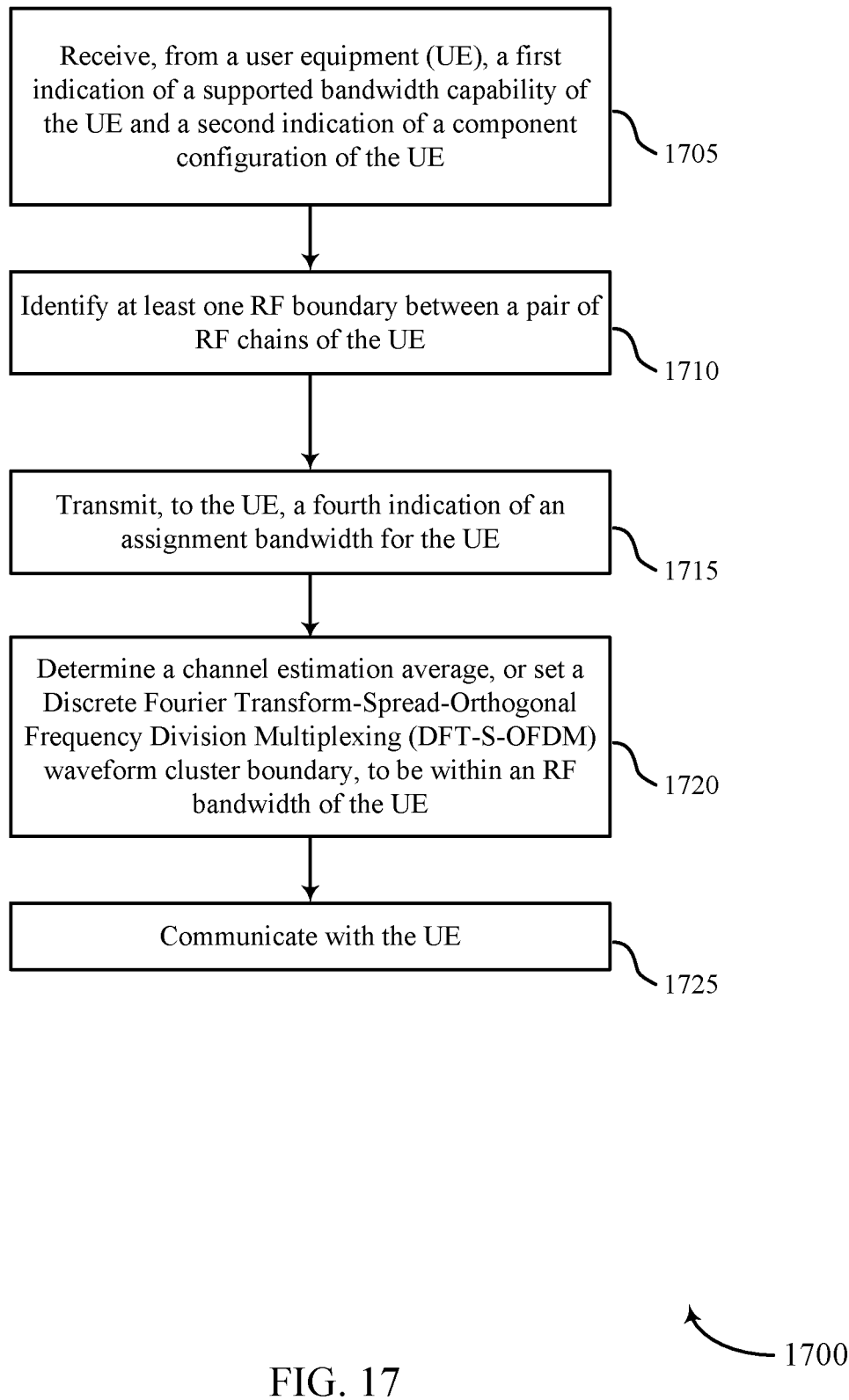
FIG. 17 is a flow chart illustrating an example of a method for wireless communication at a network access device, in accordance with various aspects of the present disclosure.

FIG. 17 is a flow chart illustrating an example of a method 1700 for wireless communication at a network access device, in accordance with various aspects of the present disclosure. For clarity, the method 1700 is described below with reference to aspects of one or more of the network access devices described with reference to FIGS. 1-4, 11, and 15, aspects of the apparatus described with reference to FIG. 13, or aspects of one or more of the wireless communication managers described with reference to FIGS. 1, 13, and 15. In some examples, a network access device may execute one or more sets of codes to control the functional elements of the network access device to perform the functions described below. Additionally or alternatively, the network access device may perform one or more of the functions described below using special-purpose hardware.

At block 1705, the method 1700 may include receiving, from a UE, a first indication of a supported RF bandwidth capability of the UE and a second indication of an RF component configuration of the UE, as described for example with reference to FIGS. 4 and 11. The RF component configuration of the UE may be associated with the supported RF bandwidth capability of the UE. In some examples, the RF component configuration of the UE may include a number of RF chains of the UE, a number of power amplifiers of the UE, a maximum power parameter for at least one RF chain of the UE, a PLL configuration of the number of RF chains, a DFT size parameter of the UE, a dynamic frequency re-tuning parameter of the UE, or a combination thereof. In some examples, the supported RF bandwidth capability of the UE may include an RF chain bandwidth configuration, an aggregate RF bandwidth of the UE, an indication of support for non-contiguous bandwidth within the aggregate RF bandwidth of the UE, at least one RF bandwidth boundary of the UE, or a combination thereof. In some examples, the operation(s) at block 1705 may include receiving a third indication that the supported RF bandwidth capability of the UE or the RF component configuration of the UE is associated with a link direction, a carrier frequency, or a combination thereof. In some examples, the operation(s) at block 1705 may be performed using the RF capability and configuration manager described with reference to FIG. 13.

At block 1710, the method 1700 may optionally include identifying, from at least one of the first indication of the supported RF bandwidth capability of the UE or the second indication of the RF component configuration of the UE, at least one RF boundary between a pair of RF chains of the UE, as described for example with reference to FIG. 11. In some examples, the at least one RF boundary may be identified based at least in part on a system RF bandwidth, an RF bandwidth of the UE, or a dynamic frequency re-tuning capability of the UE. In some examples, the operation(s) at block 1710 may be performed using the RF capability and configuration identifier described with reference to FIG. 13.

At block 1715, the method 1700 may optionally include transmitting, to the UE, a fourth indication of an RF assignment bandwidth for the UE, as described for example with reference to FIGS. 5-11. In some examples, the operation(s) at block 1715 may be performed using the RF assignment bandwidth manager described with reference to FIG. 13.

In some examples of the method 1700, the first indication of the supported RF bandwidth capability of the UE may indicate at least one uplink RF chain bandwidth boundary of the UE. In these examples, and at block 1720, the method 1700 may optionally include determining a channel estimation average, or setting a DFT-S-OFDM waveform cluster boundary, to be within an RF bandwidth of the UE defined by the at least one uplink RF chain bandwidth boundary of the UE, as described for example with reference to FIGS. 5-11. In some examples, the operation(s) at block 1720 may be performed using the channel estimation manager or UE communication manager described with reference to FIG. 13.

At block 1725, the method 1700 may include communicating with the UE based at least in part on the supported RF bandwidth capability of the UE and the RF component configuration of the UE, and in some cases based at least in part on the RF assignment bandwidth for the UE, as described for example with reference to FIGS. 4 and 11. In some examples, the operation(s) at block 1725 may be performed using the UE communication manager described with reference to FIG. 13.

In some examples of the method 1700, the first indication of the supported RF bandwidth capability may indicate an RF chain bandwidth of the UE. In these examples, the operation(s) at block 1715 may include transmitting, to the UE, a fourth indication of an RF assignment bandwidth associated with a transmission of a SIB, a paging message, or an indication of a PRG used for channel estimation. The RF assignment bandwidth may be within the RF chain bandwidth.

In some examples of the method 1700, the first indication of the supported RF bandwidth capability may indicate an RF chain bandwidth of the UE. In these examples, the operation(s) at block 1715 may include transmitting, to the UE, a fourth indication of an RF assignment bandwidth associated with a transmission of CQI feedback or an SRS. The RF assignment bandwidth may be within the RF chain bandwidth.

In some examples of the method 1700, the first indication of the supported RF bandwidth capability may indicate an RF chain bandwidth of the UE. In these examples, the operation(s) at block 1715 may include transmitting, to the UE, a fourth indication of an RF assignment bandwidth for the UE. The RF assignment bandwidth for the UE may be less than the RF chain bandwidth of the UE. In some examples, the RF assignment bandwidth may be associated with communication based at least in part on a carrier frequency, a waveform type, or a combination thereof. The method 1700 may also include communicating with the UE, at block 1725, based at least in part on the RF assignment bandwidth.

In some examples, the method 1700 may include performing at least one of a downlink communication or an uplink communication with the UE (e.g., at block 1725), or scheduling a sidelink communication for the UE, based at least in part on at least one RF boundary identified at block 1710.

In some examples, the method 1700 may include refraining from scheduling or transmitting a signal or a channel with an RF assignment bandwidth that overlaps an RF boundary of the at least one RF boundary.

The methods 1600 and 1700 described with reference to FIGS. 16 and 17 may provide for wireless communication. It should be noted that the methods 1600 and 1700 are example implementations of some of the techniques described in the present disclosure, and the operations of the methods 1600 and 1700 may be rearranged, combined with other operations, or otherwise modified, such that other implementations are possible. Operations may also be added to the methods 1600 and 1700.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
    transmitting, to a network access device, a first indication of a supported bandwidth capability of the UE, wherein the supported bandwidth capability of the UE is less than a maximum component carrier bandwidth associated with the network access device;
    receiving, from the network access device, a second indication including an assignment bandwidth for a broadcast message, wherein the assignment bandwidth is within the supported bandwidth capability of the UE;
    receiving the broadcast message over a component carrier in accordance with the supported bandwidth capability of the UE and the assignment bandwidth for the broadcast message; and
    communicating with the network access device over the component carrier based at least in part on the broadcast message and the supported bandwidth capability of the UE.

2. The method of claim 1, further comprising:
    transmitting a third indication that the supported bandwidth capability of the UE is associated with at least one of: a link direction, a carrier frequency, or a combination thereof.

3. The method of claim 1, further comprising:
    transmitting a third indication of a component configuration associated with the supported bandwidth capability of the UE, wherein the component configuration comprises at least one of: a number of radio frequency (RF) chains, a number of power amplifiers of the UE, a maximum power parameter for at least one RF chain, a phase-locked loop (PLL) configuration of the number of RF chains, a Discrete Fourier Transform (DFT) size parameter of the UE, a dynamic frequency re-tuning parameter of the UE, or a combination thereof.

4. The method of claim 1, wherein the supported bandwidth capability of the UE comprises at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

5. The method of claim 1, wherein the second indication includes an assignment bandwidth for an indication of a Precoding Resource Block Group (PRG) used for channel estimation, and the assignment bandwidth for the indication of the PRG is within the supported bandwidth capability of the UE.

6. The method of claim 1, wherein the second indication includes an assignment bandwidth of a subband for Channel Quality Information (CQI) feedback, and the assignment bandwidth of the subband is within the supported bandwidth capability of the UE, the method further comprising:
    transmitting, to the network access device, the CQI feedback within the supported bandwidth capability of the UE.

7. The method of claim 1, wherein the second indication includes an assignment bandwidth for a Sounding Reference Signal (SRS) transmission, and the assignment bandwidth for the SRS transmission is within the supported bandwidth capability of the UE, the method further comprising:
   transmitting, to the network access device, the SRS transmission within the supported bandwidth capability of the UE.

8. The method of claim 1, wherein the second indication includes a downlink reference signal (RS) indicating one or more boundaries of network access device radio frequency (RF) component bandwidths, the method further comprising:
   estimating a phase offset based at least on one of the received one or more boundaries; and
   performing a coherent positioning operation based on the estimated phase offset.

9. The method of claim 8, wherein the network access device RF component bandwidths are specified as a set of values providing a frequency granularity.

10. The method of claim 1, wherein the supported bandwidth capability of the UE is specified as a set of values providing a frequency granularity.

11. The method of claim 1, further comprising:
   receiving a transmission over a wideband component carrier (CC) using a set of radio frequency chains configured to perform an intra-band contiguous carrier aggregation for different frequency ranges of the wideband CC.

12. The method of claim 1, wherein the assignment bandwidth is associated with communication based at least in part on: a carrier frequency, a waveform type, or a combination thereof.

13. The method of claim 1, wherein the first indication of the supported bandwidth capability includes at least one boundary between a pair of radio frequency chains of the UE.

14. The method of claim 13, wherein the communicating comprises:
   performing at least one of a downlink communication, an uplink communication, or a sidelink communication based at least in part on the at least one boundary.

15. The method of claim 13, wherein the communicating comprises:
   determining that a signal or channel associated with the assignment bandwidth overlaps a boundary of the at least one boundary; and
   refraining from communication based on the signal or the channel.

16. A method for wireless communication at a user equipment (UE), comprising:
   transmitting, to a network access device, a first indication of a supported bandwidth capability of the UE and a second indication of a component configuration associated with the supported bandwidth capability of the UE, wherein the component configuration comprises a first RF chain and a second RF chain; and
   communicating with the network access device based at least in part on the supported bandwidth capability of the UE and the component configuration of the UE.

17. The method of claim 16, wherein the component configuration further comprises the first RF chain and the second RF chain associated with a single power amplifier, and no support for dynamic frequency re-tuning for the first RF chain and the second RF chain, the method further comprising:
   receiving a third indication of an assignment bandwidth for a Discrete Fourier Transform-Spread-Orthogonal Frequency Division Multiplexing (DFT-S-OFDM) waveform, the assignment bandwidth spanning a first bandwidth of the first RF chain and a second bandwidth of the second RF chain; and
   performing separate Discrete Fourier Transform (DFT) operations on first and second portions of the DFT-S-OFDM waveform received using the first RF chain and the second RF chain.

18. The method of claim 16, wherein the component configuration further comprises the first RF chain associated with a first power amplifier, the second RF chain associated with a second power amplifier, and no support for dynamic frequency re-tuning for the first RF chain and the second RF chain, the method further comprising:
   receiving a third indication of an assignment bandwidth for a Discrete Fourier Transform-Spread-Orthogonal Frequency Division Multiplexing (DFT-S-OFDM) waveform, the assignment bandwidth spanning a first bandwidth of the first RF chain and a second bandwidth of the second RF chain;
   performing a single Discrete Fourier Transform (DFT) operation on the DFT-S-OFDM waveform using the first RF chain and the second RF chain; and
   performing separate DFT cluster operations on the DFT-S-OFDM waveform using the first RF chain and the second RF chain, in which a first DFT cluster associated with the first RF chain and a second DFT cluster associated with the second RF chain are contiguous in phase and resource allocation.

19. The method of claim 16, wherein the component configuration further comprises the first RF chain associated with a first power amplifier, the second RF chain associated with a second power amplifier, support for dynamic frequency re-tuning for at least one of the first RF chain or the second RF chain, and no support for non-contiguous aggregate RF chain bandwidth, the method further comprising:
   receiving a third indication of a contiguous assignment bandwidth for a Discrete Fourier Transform-Spread-Orthogonal Frequency Division Multiplexing (DFT-S-OFDM) waveform, the contiguous assignment bandwidth associated with a bandwidth less than or equal to an aggregate bandwidth of the UE included in the supported bandwidth capability of the UE, and the contiguous assignment bandwidth spanning a first bandwidth of the first RF chain and a second bandwidth of the second RF chain;
   frequency re-tuning at least one of the first bandwidth or the second bandwidth based at least in part on the contiguous assignment bandwidth;
   performing, after the frequency re-tuning, a single Discrete Fourier Transform (DFT) operation on the DFT-S-OFDM waveform using the first RF chain and the second RF chain; and
   performing separate DFT cluster operations on the DFT-S-OFDM waveform using the first RF chain and the second RF chain, in which a first DFT cluster associated with the first RF chain and a second DFT cluster associated with the second RF chain are contiguous in phase and resource allocation.

20. The method of claim 16, wherein the component configuration further comprises the first RF chain associated with a first power amplifier, the second RF chain associated with a second power amplifier, support for dynamic frequency re-tuning for at least one of the first RF chain or the second RF chain, and support for non-contiguous aggregate RF chain bandwidth, the method further comprising:
  receiving a third indication of a non-contiguous assignment bandwidth for a Discrete Fourier Transform-Spread-Orthogonal Frequency Division Multiplexing (DFT-S-OFDM) waveform, the non-contiguous assignment bandwidth associated with a bandwidth less than or equal to an aggregate RF chain bandwidth of the UE included in the supported bandwidth capability of the UE, and the non-contiguous assignment bandwidth spanning a first bandwidth of the first RF chain and a second bandwidth of the second RF chain;
  frequency re-tuning at least one of the first bandwidth or the second bandwidth based at least in part on the non-contiguous assignment bandwidth;
  performing, after the frequency re-tuning, a single Discrete Fourier Transform (DFT) operation on the DFT-S-OFDM waveform using the first RF chain and the second RF chain; and
  performing separate DFT cluster operations on the DFT-S-OFDM waveform using the first RF chain and the second RF chain, in which a first DFT cluster associated with the first RF chain and a second DFT cluster associated with the second RF chain are contiguous in phase and resource allocation.

21. An apparatus for wireless communication at a user equipment (UE), comprising:
  means for transmitting, to a network access device, a first indication of a supported bandwidth capability of the UE, wherein the supported bandwidth capability of the UE is less than a maximum component carrier bandwidth associated with the network access device;
  means for receiving, from the network access device, a second indication including an assignment bandwidth for a broadcast message, wherein the assignment bandwidth is within the supported bandwidth capability of the UE;
  means for receiving the broadcast message over a component carrier in accordance with the supported bandwidth capability of the UE and the assignment bandwidth for the broadcast message; and
  means for communicating with the network access device over the component carrier based at least in part on the broadcast message and the supported bandwidth capability of the UE.

22. The apparatus of claim 21, further comprising:
  means for transmitting a third indication that the supported bandwidth capability of the UE is associated with at least one of: a link direction, a carrier frequency, or a combination thereof.

23. The apparatus of claim 21, further comprising:
  means for transmitting a third indication of a component configuration associated with the supported bandwidth capability of the UE, wherein the component configuration comprises at least one of: a number of radio frequency (RF) chains, a number of power amplifiers of the UE, a maximum power parameter for at least one RF chain, a phase-locked loop (PLL) configuration of the number of RF chains, a Discrete Fourier Transform (DFT) size parameter of the UE, a dynamic frequency re-tuning parameter of the UE, or a combination thereof.

24. The apparatus of claim 21, wherein the supported bandwidth capability of the UE comprises at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

25. The apparatus of claim 21, wherein the second indication includes an assignment bandwidth for an indication of a Precoding Resource Block Group (PRG) used for channel estimation, and the assignment bandwidth for the indication of the PRG is within the supported bandwidth capability of the UE.

26. The apparatus of claim 21, wherein the second indication includes an assignment bandwidth of a subband for Channel Quality Information (CQI) feedback, and the assignment bandwidth of the subband is within the supported bandwidth capability of the UE, the apparatus further comprising:
  means for transmitting, to the network access device, the CQI feedback within the supported bandwidth capability of the UE.

27. The apparatus of claim 21, wherein the second indication includes an assignment bandwidth for a Sounding Reference Signal (SRS) transmission, and the assignment bandwidth for the SRS transmission is within the supported bandwidth capability of the UE, the apparatus further comprising:
  means for transmitting, to the network access device, the SRS transmission within the supported bandwidth capability of the UE.

28. The apparatus of claim 21, wherein the second indication includes a downlink reference signal (RS) indicating one or more boundaries of network access device radio frequency (RF) component bandwidths, the apparatus further comprising:
  means for estimating a phase offset based at least on one of the received one or more boundaries; and
  means for performing a coherent positioning operation based on the estimated phase offset.

29. The apparatus of claim 28, wherein the network access device RF bandwidths are specified as a set of values providing a frequency granularity.

30. The apparatus of claim 21, wherein the supported bandwidth capability of the UE is specified as a set of values providing a frequency granularity.

31. The apparatus of claim 21, further comprising:
  means for receiving a transmission over a wideband component carrier (CC) using a set of radio frequency chains configured to perform an intra-band contiguous carrier aggregation for different frequency ranges of the wideband CC.

32. The apparatus of claim 21, wherein the assignment bandwidth is associated with communication based at least in part on: a carrier frequency, a waveform type, or a combination thereof.

33. The apparatus of claim 21, wherein the first indication of the supported bandwidth capability of the UE includes at least one boundary between a pair of radio frequency chains of the UE.

34. The apparatus of claim 33, wherein the means for communicating further comprises:
  means for performing at least one of a downlink communication, an uplink communication, or a sidelink communication based at least in part on the at least one boundary.

35. The apparatus of claim 33, wherein the means for communicating further comprises:
  means for determining that a signal or channel associated with the assignment bandwidth overlaps a boundary of the at least one boundary; and means for refraining from communication based on the signal or the channel.

36. An apparatus for wireless communication at a user equipment (UE), comprising:
a processor;
memory in electronic communication with the processor; and
instructions stored in the memory, wherein the instructions are executable by the processor to:
transmit, to a network access device, a first indication of a supported bandwidth capability of the UE, wherein the supported bandwidth capability of the UE is less than a maximum component carrier bandwidth associated with the network access device;
receive, from the network access device, a second indication including an assignment bandwidth for a broadcast message, wherein the assignment bandwidth is within the supported bandwidth capability of the UE;
receive the broadcast message over a component carrier in accordance with the supported bandwidth capability of the UE and the assignment bandwidth for the broadcast message; and
communicate with the network access device over the component carrier based at least in part on the broadcast message and the supported bandwidth capability of the UE.

37. The apparatus of claim 36, wherein the instructions are further executable to:
transmit a third indication that the supported bandwidth capability of the UE is associated with at least one of: a link direction, a carrier frequency, or a combination thereof.

38. The apparatus of claim 36, wherein the instructions are further executable to:
transmit a third indication of a component configuration associated with the supported bandwidth capability of the UE, the component configuration comprising at least one of: a number of radio frequency (RF) chains of the UE, a number of power amplifiers of the UE, a maximum power parameter for at least one RF chain of the UE, a phase-locked loop (PLL) configuration of the number of RF chains, a Discrete Fourier Transform (DFT) size parameter of the UE, a dynamic frequency re-tuning parameter of the UE, or a combination thereof.

39. The apparatus of claim 36, wherein the supported bandwidth capability of the UE further comprises at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

40. The apparatus of claim 36, wherein the second indication includes an assignment bandwidth for an indication of a Precoding Resource Block Group (PRG) used for channel estimation, and the assignment bandwidth for the indication of the PRG is within the supported bandwidth capability of the UE.

41. The apparatus of claim 36, wherein the second indication includes an assignment bandwidth of a subband for Channel Quality Information (CQI) feedback, and the assignment bandwidth of the subband is within the supported bandwidth capability of the UE, and the instructions are further executable to:
transmit, to the network access device, the CQI feedback within the supported bandwidth capability of the UE.

42. The apparatus of claim 36, wherein the second indication includes an assignment bandwidth for a Sounding Reference Signal (SRS) transmission, and the assignment bandwidth for the SRS transmission is within the supported bandwidth capability of the UE, and the instructions are further executable to:
transmit, to the network access device, the SRS transmission within the supported bandwidth capability of the UE.

43. The apparatus of claim 36, wherein the second indication includes a downlink reference signal (RS) indicating one or more boundaries of network access device radio frequency (RF) component bandwidths, and the instructions are further executable to:
estimate a phase offset based at least on one of the received one or more boundaries and at least one boundary within the supported bandwidth capability of the UE; and
perform a coherent positioning operation based on the estimated phase offset.

44. The apparatus of claim 43, wherein the network access device RF bandwidths are specified as a set of values providing a frequency granularity.

45. The apparatus of claim 36, wherein the supported bandwidth capability of the UE is specified as a set of values providing a frequency granularity.

46. The apparatus of claim 36, wherein the instructions are further executable to:
receive a transmission over a wideband component carrier (CC) using a set of radio frequency (RF) chains configured to perform an intra-band contiguous carrier aggregation for different frequency ranges of the wideband CC.

47. The apparatus of claim 36, wherein the assignment bandwidth is associated with communication based at least in part on: a carrier frequency, a waveform type, or a combination thereof.

48. The apparatus of claim 36, wherein the first indication of the supported bandwidth capability of the UE includes at least one boundary between a pair of radio frequency chains of the UE.

49. The apparatus of claim 48, wherein the instructions are further executable to:
perform at least one of a downlink communication, an uplink communication, or a sidelink communication based at least in part on the at least one boundary.

50. The apparatus of claim 48, wherein the instructions are further executable to:
determine that a signal or channel associated with the assignment bandwidth overlaps a boundary of the at least one boundary; and
refrain from communication based on the signal or the channel.

51. A non-transitory computer-readable medium storing code for wireless communication at a user equipment (UE), the code comprising instructions executable to:
transmit, to a network access device, a first indication of a supported bandwidth capability of the UE, wherein the supported bandwidth capability of the UE is less than a maximum component carrier bandwidth associated with the network access device;
receive, from the network access device, a second indication including an assignment bandwidth for a broadcast message, wherein the assignment bandwidth is within the supported bandwidth capability of the UE;

receive the broadcast message over a component carrier in accordance with the supported bandwidth capability of the UE and the assignment bandwidth for the broadcast message; and communicate with the network access device over the component carrier based at least in part on the broadcast message and the supported bandwidth capability of the UE.

52. A method for wireless communication at a network access device, comprising:

receiving, from a user equipment (UE), a first indication of a supported bandwidth capability of the UE, wherein the supported bandwidth capability of the UE is less than a maximum component carrier bandwidth associated with the network access device;

transmitting, to the UE, a second indication including an assignment bandwidth for a broadcast message, wherein the assignment bandwidth is within the supported bandwidth capability of the UE;

transmitting the broadcast message over a component carrier in accordance with the supported bandwidth capability of the UE and the assignment bandwidth for the broadcast message; and communicating with the UE over the component carrier based at least in part on the broadcast message and the supported bandwidth capability of the UE.

53. The method of claim 52, wherein the second indication includes an assignment bandwidth for an indication of a Precoding Resource Block Group (PRG) used for channel estimation, and the assignment bandwidth for the indication of the PRG is within the supported bandwidth capability of the UE.

54. The method of claim 52, wherein the second indication includes an assignment bandwidth of a subband for Channel Quality Information (CQI) feedback, and the assignment bandwidth of the subband is within the supported bandwidth capability of the UE, the method further comprising:

receiving from the UE the CQI feedback within the supported bandwidth capability of the UE.

55. The method of claim 52, wherein the second indication includes an assignment bandwidth for a Sounding Reference Signal (SRS) transmission, and the assignment bandwidth for the SRS transmission is within the supported bandwidth capability of the UE, the method further comprising:

receiving from the UE the SRS transmission within the supported bandwidth capability of the UE.

56. The method of claim 55, wherein the network access device RF bandwidths are specified as a set of values providing a frequency granularity.

57. The method of claim 52, wherein the first indication includes an uplink reference signal (RS) indicating at least one boundary associated with the supported bandwidth capability of the UE, the method further comprising:

estimating a phase offset based at least on the at least one boundary associated with the supported bandwidth capability of the UE and at least one boundary of the network access device radio frequency (RF) bandwidths; and performing a coherent positioning operation based on the estimated phase offset.

58. The method of claim 52, wherein the supported bandwidth capability of the UE is specified as a set of values providing a frequency granularity.

59. The method of claim 52, wherein the supported bandwidth capability of the UE comprises at least one of: a component bandwidth configuration of the UE, an aggregate bandwidth configuration of the UE, an indication of support for non-contiguous bandwidth within an aggregate bandwidth of the UE, at least one component bandwidth within the aggregate bandwidth of the UE or a combination thereof.

60. The method of claim 52, the method further comprising:

receiving a third indication of a component configuration of the UE, wherein the component configuration of the UE comprises at least one of: a number of radio frequency (RF) chains of the UE, a number of power amplifiers of the UE, a maximum power parameter for at least one RF chain of the UE, a phase-locked loop (PLL) configuration of the number of RF chains, a Discrete Fourier Transform (DFT) size parameter of the UE, a dynamic frequency re-tuning parameter of the UE, or a combination thereof.

61. The method of claim 52, further comprising:

receiving from the UE a third indication that the supported bandwidth capability of the UE is associated with at least one of: a link direction, a carrier frequency, or a combination thereof.

62. The method of claim 52, wherein the first indication of the supported bandwidth capability of the UE includes at least one uplink bandwidth boundary of the UE, the method further comprising:

determining a channel estimation average or setting a DFT-S-OFDM waveform cluster boundary to be within an uplink bandwidth defined by the at least one uplink bandwidth boundary.

63. The method of claim 52, wherein the assignment bandwidth is associated with communication based at least in part on: a carrier frequency, a waveform type, or a combination thereof.

64. The method of claim 52, wherein the first indication of the supported bandwidth capability of the UE includes at least one boundary between a pair of radio frequency chains of the UE, the method further comprising:

identifying the at least one boundary.

65. The method of claim 64, wherein the communicating comprises:

performing at least one of a downlink communication or an uplink communication with the UE, or scheduling a sidelink communication for the UE, based at least in part on the at least one boundary.

66. The method of claim 64, wherein the communicating comprises:

refraining from scheduling or transmitting a signal or a channel with an assignment bandwidth that overlaps a boundary of the at least one boundary.

67. A method for wireless communication at a network access device, comprising:

receiving, from a user equipment (UE), a first indication of a supported bandwidth capability of the UE, and a second indication of a component configuration associated with the supported bandwidth capability of the UE, wherein the component configuration comprises a first RF chain and a second RF chain; and communicating with the UE based at least in part on the supported bandwidth capability of the UE and the component configuration of the UE.

68. The method of claim 67, further comprising:

receiving a third indication that the supported bandwidth capability of the UE is associated with at least one of: a link direction, a carrier frequency, or a combination thereof.

69. An apparatus for wireless communication at a network access device, comprising:
  means for receiving, from a user equipment (UE), a first indication of a supported bandwidth capability of the UE, wherein the supported bandwidth capability of the UE is less than a maximum component carrier bandwidth associated with the network access device;
  means for transmitting to the UE a second indication including an assignment bandwidth for a broadcast message, wherein the assignment bandwidth is within the supported bandwidth capability of the UE;
  means for transmitting the broadcast message over a component carrier in accordance with the supported bandwidth capability of the UE and the assignment bandwidth for the broadcast message; and
  means for communicating with the UE over the component carrier based at least in part on the broadcast message and the supported bandwidth capability of the UE.

70. The apparatus of claim 69, wherein the second indication includes an assignment bandwidth for an indication of a Precoding Resource Block Group (PRG) used for channel estimation, and the assignment bandwidth for the indication of the PRG is within the supported bandwidth capability of the UE.

71. The apparatus of claim 69, wherein the second indication includes an assignment bandwidth of a subband for Channel Quality Information (CQI) feedback, and the assignment bandwidth of the subband is within the supported bandwidth capability of the UE, the apparatus further comprising:
  means for receiving from the UE the CQI feedback within the supported bandwidth capability of the UE.

72. The apparatus of claim 69, wherein the second indication includes an assignment bandwidth for a Sounding Reference Signal (SRS) transmission, and the assignment bandwidth for the SRS transmission within the supported bandwidth capability of the UE, the apparatus further comprising:
  means for receiving from the UE the SRS transmission within the supported bandwidth capability of the UE.

73. The apparatus of claim 69, wherein the first indication includes an uplink reference signal (RS) indicating at least one boundary associated with the supported bandwidth capability of the UE, the apparatus further comprising:
  means for estimating a phase offset based at least on the at least one boundary associated with the supported bandwidth capability of the UE and at least one boundary of the network access device radio frequency (RF) bandwidths; and
  means for performing a coherent positioning operation based on the estimated phase offset.

74. The apparatus of claim 69, wherein the supported bandwidth capability of the UE is specified as a set of values providing a frequency granularity.

75. The apparatus of claim 69, wherein the network access device RF bandwidths are specified as a set of values providing a frequency granularity.

76. The apparatus of claim 69, wherein the supported bandwidth capability of the UE comprises at least one of: a component bandwidth configuration, an aggregate bandwidth configuration of the UE, an indication of support for non-contiguous bandwidth within an aggregate bandwidth of the UE, at least one boundary within the supported bandwidth capability of the UE or a combination thereof.

77. The apparatus of claim 69, further comprising:
  means for receiving from the UE a third indication that the supported bandwidth capability of the UE is associated with at least one of: a link direction, a carrier frequency, or a combination thereof.

78. The apparatus of claim 69, further comprising:
  means for receiving a third indication of a component configuration associated with the supported bandwidth capability of the UE, wherein the component configuration comprises at least one of: a number of radio frequency (RF) chains of the UE, a number of power amplifiers of the UE, a maximum power parameter for at least one RF chain of the UE, a phase-locked loop (PLL) configuration of the number of RF chains, a Discrete Fourier Transform (DFT) size parameter of the UE, a dynamic frequency re-tuning parameter of the UE, or a combination thereof.

79. The apparatus of claim 69, wherein the first indication of the supported bandwidth capability of the UE includes at least one uplink bandwidth boundary associated with the supported bandwidth capability of the UE, the apparatus further comprising:
  means for determining a channel estimation average or setting a DFT-S-OFDM waveform cluster boundary to be within an uplink bandwidth defined by the at least one uplink bandwidth boundary.

80. The apparatus of claim 69, wherein the assignment bandwidth is associated with communication based at least in part on: a carrier frequency, a waveform type, or a combination thereof.

81. The apparatus of claim 69, wherein the first indication of the supported bandwidth capability of the UE includes at least one boundary between a pair of radio frequency chains of the UE, the apparatus further comprising:
  means for identifying the at least one boundary.

82. The apparatus of claim 81, wherein the means for communicating further comprises:
  means for performing at least one of a downlink communication or an uplink communication with the UE, or scheduling a sidelink communication for the UE, based at least in part on the at least one boundary.

83. The apparatus of claim 81, wherein the means for communicating further comprises:
  means for refraining from scheduling or transmitting a signal or a channel with an assignment bandwidth that overlaps a boundary of the at least one boundary.

84. An apparatus for wireless communication at a network access device, comprising:
  a processor;
  memory in electronic communication with the processor; and
  instructions stored in the memory, wherein the instructions are executable by the processor to:
  receive, from a user equipment (UE), a first indication of a supported bandwidth capability of the UE, wherein the supported bandwidth capability of the UE is less than a maximum component carrier bandwidth associated with the network access device;
  transmit, to the UE, a second indication including an assignment bandwidth for a broadcast message, wherein the assignment bandwidth is within the supported bandwidth capability of the UE;
  transmit the broadcast message over a component carrier in accordance with the supported bandwidth capability of the UE and the assignment bandwidth for the broadcast message; and communicate with the network access device over the component carrier based at least in part on the broadcast message and the supported bandwidth capability of the UE.

85. A non-transitory computer-readable medium storing code for wireless communication at a network access device, the code comprising instructions executable to:

receive, from a user equipment (UE), a first indication of a supported bandwidth capability of the UE, wherein the supported bandwidth capability of the UE is less than a maximum component carrier bandwidth associated with the network access device;

transmit, to the UE, a second indication including an assignment bandwidth for a broadcast message, wherein the assignment bandwidth is within the supported bandwidth capability of the UE;

transmit the broadcast message over a component carrier in accordance with the supported bandwidth capability of the UE and the assignment bandwidth for the broadcast message; and communicate with the network access device over the component carrier based at least in part on the broadcast message and the supported bandwidth capability of the UE.

\* \* \* \* \*